(12) United States Patent
Boynton et al.

(10) Patent No.: US 8,127,342 B2
(45) Date of Patent: Feb. 28, 2012

(54) SECURE END-TO-END TRANSPORT THROUGH INTERMEDIARY NODES

(75) Inventors: Lee R. Boynton, Lake Oswego, OR (US); Trevor A. Fiatal, Fremont, CA (US); Scott M. Burke, Mountain View, CA (US); Mark Sikes, Ben Lomond, CA (US)

(73) Assignee: Seven Networks, Inc., Redwood City, CA (US)

( * ) Notice: Subject to any disclaimer, the term of this patent is extended or adjusted under 35 U.S.C. 154(b) by 0 days.

(21) Appl. No.: 12/889,252

(22) Filed: Sep. 23, 2010

(65) Prior Publication Data

US 2011/0099363 A1  Apr. 28, 2011

Related U.S. Application Data

(63) Continuation of application No. 11/875,785, filed on Oct. 19, 2007, now Pat. No. 7,827,597, which is a continuation of application No. 10/339,369, filed on Jan. 8, 2003, now Pat. No. 7,305,700.

(60) Provisional application No. 60/346,881, filed on Jan. 8, 2002, provisional application No. 60/403,249, filed on Aug. 12, 2002.

(51) Int. Cl.
*H04L 29/00* (2006.01)
(52) U.S. Cl. ............................... 726/4; 380/270
(58) Field of Classification Search ............ 726/15
See application file for complete search history.

(56) References Cited

U.S. PATENT DOCUMENTS

| 222,458 A | 12/1879 | Connolly et al. |
| 447,918 A | 3/1891 | Strowger |
| 4,200,770 A | 4/1980 | Hellman et al. |
| 4,255,796 A | 3/1981 | Gabbe et al. |
| 4,276,597 A | 6/1981 | Dissly et al. |
| 4,531,020 A | 7/1985 | Wechselberger et al. |
| 4,807,182 A | 2/1989 | Queen |
| 4,831,582 A | 5/1989 | Miller et al. |
| 4,875,159 A | 10/1989 | Cary et al. |
| 4,897,781 A | 1/1990 | Chang et al. |
| 4,972,457 A | 11/1990 | O'Sullivan |
| 5,008,853 A | 4/1991 | Bly et al. |
| 5,159,624 A | 10/1992 | Makita |
| 5,220,657 A | 6/1993 | Bly et al. |
| 5,263,157 A | 11/1993 | Janis |
| 5,283,856 A | 2/1994 | Gross et al. |

(Continued)

FOREIGN PATENT DOCUMENTS

EP  0772327 A2  5/1997

(Continued)

OTHER PUBLICATIONS

Allchin, James Edward, "An Architecture for Reliable Decentralized Systems," Ph.D. Thesis, Georgia Institute of Technology, 185 pages, Sep. 1983.

(Continued)

*Primary Examiner* — Matthew Smithers
(74) *Attorney, Agent, or Firm* — Perkins Coie LLP

(57) ABSTRACT

A communication network encrypts a first portion of a transaction associated with point-to-point communications using a point-to-point encryption key. A second portion of the transaction associated with end-to-end communications is encrypted using an end-to-end encryption key.

22 Claims, 7 Drawing Sheets

U.S. PATENT DOCUMENTS

| | | |
|---|---|---|
| 5,357,431 A | 10/1994 | Nakada et al. |
| 5,384,892 A | 1/1995 | Strong |
| 5,386,564 A | 1/1995 | Shearer et al. |
| 5,392,390 A | 2/1995 | Crozier |
| 5,434,994 A | 7/1995 | Shaheen et al. |
| 5,436,960 A | 7/1995 | Campana, Jr. et al. |
| 5,438,611 A | 8/1995 | Campana, Jr. et al. |
| 5,479,472 A | 12/1995 | Campana, Jr. et al. |
| 5,487,100 A | 1/1996 | Kane |
| 5,493,692 A | 2/1996 | Theimer et al. |
| 5,519,606 A | 5/1996 | Frid-Nielsen et al. |
| 5,555,376 A | 9/1996 | Theimer et al. |
| 5,559,800 A | 9/1996 | Mousseau et al. |
| 5,572,571 A | 11/1996 | Shirai |
| 5,572,643 A | 11/1996 | Judson |
| 5,574,859 A | 11/1996 | Yeh |
| 5,581,749 A | 12/1996 | Hossain et al. |
| 5,600,834 A | 2/1997 | Howard |
| 5,603,054 A | 2/1997 | Theimer et al. |
| 5,604,788 A | 2/1997 | Tett |
| 5,613,012 A | 3/1997 | Hoffman et al. |
| 5,619,507 A | 4/1997 | Tsuda |
| 5,619,648 A | 4/1997 | Canale et al. |
| 5,623,601 A | 4/1997 | Vu |
| 5,625,670 A | 4/1997 | Campana, Jr. et al. |
| 5,625,815 A | 4/1997 | Maier et al. |
| 5,627,658 A | 5/1997 | Connors et al. |
| 5,630,081 A | 5/1997 | Rybicki et al. |
| 5,631,946 A | 5/1997 | Campana, Jr. et al. |
| 5,632,018 A | 5/1997 | Otorii |
| 5,634,053 A | 5/1997 | Noble et al. |
| 5,647,002 A | 7/1997 | Brunson |
| 5,652,884 A | 7/1997 | Palevich |
| 5,664,207 A | 9/1997 | Crumpler et al. |
| 5,666,530 A | 9/1997 | Clark et al. |
| 5,666,553 A | 9/1997 | Crozier |
| 5,680,542 A | 10/1997 | Mulchandani et al. |
| 5,682,524 A | 10/1997 | Freund et al. |
| 5,684,990 A | 11/1997 | Boothby |
| 5,689,654 A | 11/1997 | Kikinis et al. |
| 5,692,039 A | 11/1997 | Brankley et al. |
| 5,696,903 A | 12/1997 | Mahany |
| 5,701,423 A | 12/1997 | Crozier |
| 5,701,469 A | 12/1997 | Brandli et al. |
| 5,704,029 A | 12/1997 | Wright, Jr. |
| 5,706,211 A | 1/1998 | Beletic et al. |
| 5,706,502 A | 1/1998 | Foley et al. |
| 5,706,507 A | 1/1998 | Schloss |
| 5,710,918 A | 1/1998 | Lagarde et al. |
| 5,713,019 A | 1/1998 | Keaten |
| 5,715,403 A | 2/1998 | Stefik |
| 5,717,925 A | 2/1998 | Harper et al. |
| 5,721,908 A | 2/1998 | Lagarde et al. |
| 5,721,914 A | 2/1998 | DeVries |
| 5,727,202 A | 3/1998 | Kucala |
| 5,729,549 A | 3/1998 | Kostreski et al. |
| 5,729,704 A | 3/1998 | Stone et al. |
| 5,729,735 A | 3/1998 | Meyering |
| 5,742,905 A | 4/1998 | Pepe et al. |
| 5,745,360 A | 4/1998 | Leone et al. |
| 5,752,186 A | 5/1998 | Malackowski et al. |
| 5,752,246 A | 5/1998 | Rogers et al. |
| 5,754,938 A | 5/1998 | Herz et al. |
| 5,757,916 A | 5/1998 | MacDoran et al. |
| 5,758,088 A | 5/1998 | Bezaire et al. |
| 5,758,150 A | 5/1998 | Bell et al. |
| 5,758,322 A | 5/1998 | Rongley |
| 5,758,354 A | 5/1998 | Huang et al. |
| 5,758,355 A | 5/1998 | Buchanan |
| 5,765,171 A | 6/1998 | Gehani et al. |
| 5,778,346 A | 7/1998 | Frid-Nielsen et al. |
| 5,778,361 A | 7/1998 | Nanjo et al. |
| 5,781,614 A | 7/1998 | Brunson |
| 5,781,901 A | 7/1998 | Kuzma |
| 5,781,906 A | 7/1998 | Aggarwal et al. |
| 5,787,430 A | 7/1998 | Doeringer et al. |
| 5,787,441 A | 7/1998 | Beckhardt |
| 5,790,425 A | 8/1998 | Wagle |
| 5,790,790 A | 8/1998 | Smith et al. |
| 5,790,974 A | 8/1998 | Tognazzini |
| 5,793,413 A | 8/1998 | Hylton et al. |
| 5,794,210 A | 8/1998 | Goldhaber et al. |
| 5,799,318 A | 8/1998 | Cardinal et al. |
| 5,802,312 A | 9/1998 | Lazaridis et al. |
| 5,802,454 A | 9/1998 | Goshay et al. |
| 5,802,518 A | 9/1998 | Karaev et al. |
| 5,802,524 A | 9/1998 | Flowers et al. |
| 5,806,074 A | 9/1998 | Souder et al. |
| 5,809,242 A | 9/1998 | Shaw et al. |
| 5,809,415 A | 9/1998 | Rossmann |
| 5,818,437 A | 10/1998 | Grover et al. |
| 5,819,172 A | 10/1998 | Campana, Jr. et al. |
| 5,819,274 A | 10/1998 | Jackson, Jr. |
| 5,819,284 A | 10/1998 | Farber et al. |
| 5,822,324 A | 10/1998 | Kostresti et al. |
| 5,822,747 A | 10/1998 | Graefe et al. |
| 5,826,269 A | 10/1998 | Hussey |
| 5,831,664 A | 11/1998 | Wharton et al. |
| 5,832,483 A | 11/1998 | Barker |
| 5,832,489 A | 11/1998 | Kucala |
| 5,832,500 A | 11/1998 | Burrows |
| 5,835,722 A | 11/1998 | Bradshaw et al. |
| 5,838,252 A | 11/1998 | Kikinis |
| 5,838,768 A | 11/1998 | Sumar et al. |
| 5,838,973 A | 11/1998 | Carpenter-Smith et al. |
| 5,845,278 A | 12/1998 | Kirsch et al. |
| 5,852,775 A | 12/1998 | Hidary |
| 5,852,820 A | 12/1998 | Burrows |
| 5,857,201 A | 1/1999 | Wright, Jr. et al. |
| 5,862,223 A | 1/1999 | Walker et al. |
| 5,867,665 A | 2/1999 | Butman et al. |
| 5,867,817 A | 2/1999 | Catallo et al. |
| 5,870,759 A | 2/1999 | Bauer et al. |
| 5,884,323 A | 3/1999 | Hawkins et al. |
| 5,889,845 A | 3/1999 | Staples et al. |
| 5,890,147 A | 3/1999 | Peltonen et al. |
| 5,892,909 A | 4/1999 | Grasso et al. |
| 5,898,780 A | 4/1999 | Liu et al. |
| 5,898,917 A | 4/1999 | Batni et al. |
| 5,903,723 A | 5/1999 | Beck et al. |
| 5,907,618 A | 5/1999 | Gennaro et al. |
| 5,909,689 A | 6/1999 | Van Ryzin |
| 5,913,032 A | 6/1999 | Schwartz et al. |
| 5,924,096 A | 7/1999 | Draper et al. |
| 5,928,325 A | 7/1999 | Shaughnessy et al. |
| 5,928,329 A | 7/1999 | Clark et al. |
| 5,937,161 A | 8/1999 | Mulligan et al. |
| 5,943,676 A | 8/1999 | Boothby |
| 5,948,066 A | 9/1999 | Whalen et al. |
| 5,951,636 A | 9/1999 | Zerber |
| 5,960,394 A | 9/1999 | Gould et al. |
| 5,960,406 A | 9/1999 | Rasansky et al. |
| 5,961,590 A | 10/1999 | Mendez et al. |
| 5,963,642 A | 10/1999 | Goldstein |
| 5,964,833 A | 10/1999 | Kikinis |
| 5,968,131 A | 10/1999 | Mendez et al. |
| 5,974,238 A | 10/1999 | Chase, Jr. |
| 5,974,327 A | 10/1999 | Agrawal et al. |
| 5,978,837 A | 11/1999 | Foladare et al. |
| 5,978,933 A | 11/1999 | Wyld et al. |
| 5,987,440 A | 11/1999 | O'Neil et al. |
| 6,000,000 A | 12/1999 | Hawkins et al. |
| 6,003,070 A | 12/1999 | Frantz |
| 6,006,274 A | 12/1999 | Hawkins et al. |
| 6,016,478 A | 1/2000 | Zhang et al. |
| 6,016,520 A | 1/2000 | Facq et al. |
| 6,018,762 A | 1/2000 | Brunson et al. |
| 6,023,700 A | 2/2000 | Owens et al. |
| 6,023,708 A | 2/2000 | Mendez et al. |
| 6,029,238 A | 2/2000 | Furukawa |
| 6,034,621 A | 3/2000 | Kaufman |
| 6,035,104 A | 3/2000 | Zahariev |
| 6,044,372 A | 3/2000 | Rothfus et al. |
| 6,044,381 A | 3/2000 | Boothby et al. |
| 6,047,051 A | 4/2000 | Ginzboorg et al. |
| 6,047,327 A | 4/2000 | Tso et al. |
| 6,052,563 A | 4/2000 | Macko |

| Patent | Type | Date | Inventor |
|---|---|---|---|
| 6,052,735 | A | 4/2000 | Ulrich et al. |
| 6,057,855 | A | 5/2000 | Barkans |
| 6,065,055 | A | 5/2000 | Hughes et al. |
| 6,073,138 | A | 6/2000 | de l'Etraz et al. |
| 6,073,142 | A | 6/2000 | Geiger et al. |
| 6,073,165 | A | 6/2000 | Narasimhan et al. |
| 6,085,166 | A | 7/2000 | Beckhardt et al. |
| 6,085,192 | A | 7/2000 | Mendez et al. |
| 6,088,677 | A | 7/2000 | Spurgeon |
| 6,101,320 | A | 8/2000 | Schuetze et al. |
| 6,101,480 | A | 8/2000 | Conmy et al. |
| 6,101,531 | A | 8/2000 | Eggleston et al. |
| 6,112,181 | A | 8/2000 | Shear et al. |
| 6,119,014 | A | 9/2000 | Alperovich et al. |
| 6,119,171 | A | 9/2000 | Alkhatib |
| 6,125,369 | A | 9/2000 | Wu et al. |
| 6,125,388 | A | 9/2000 | Reisman |
| 6,128,627 | A | 10/2000 | Mattis et al. |
| 6,130,898 | A | 10/2000 | Kostreski et al. |
| 6,131,096 | A | 10/2000 | Ng et al. |
| 6,131,116 | A | 10/2000 | Riggins et al. |
| 6,134,432 | A | 10/2000 | Holmes et al. |
| 6,138,013 | A | 10/2000 | Blanchard et al. |
| 6,138,124 | A | 10/2000 | Beckhardt |
| 6,138,128 | A | 10/2000 | Perkowitz et al. |
| 6,138,146 | A | 10/2000 | Moon et al. |
| 6,141,664 | A | 10/2000 | Boothby |
| 6,151,606 | A | 11/2000 | Mendez |
| 6,157,630 | A | 12/2000 | Adler et al. |
| 6,161,140 | A | 12/2000 | Moriya |
| 6,167,379 | A | 12/2000 | Dean et al. |
| 6,167,435 | A | 12/2000 | Druckenmiller et al. |
| 6,170,014 | B1 | 1/2001 | Darago et al. |
| 6,173,312 | B1 | 1/2001 | Atarashi et al. |
| 6,173,446 | B1 | 1/2001 | Khan et al. |
| 6,175,831 | B1 | 1/2001 | Weinreich et al. |
| 6,178,419 | B1 | 1/2001 | Legh-Smith et al. |
| 6,181,935 | B1 | 1/2001 | Gossman et al. |
| 6,195,533 | B1 | 2/2001 | Tkatch et al. |
| 6,198,696 | B1 | 3/2001 | Korpi et al. |
| 6,198,922 | B1 | 3/2001 | Baynham |
| 6,201,469 | B1 | 3/2001 | Balch et al. |
| 6,202,085 | B1 | 3/2001 | Benson et al. |
| 6,205,448 | B1 | 3/2001 | Kruglikov et al. |
| 6,212,529 | B1 | 4/2001 | Boothby et al. |
| 6,219,694 | B1 | 4/2001 | Lazaridis et al. |
| 6,221,877 | B1 | 4/2001 | Aronov et al. |
| 6,223,187 | B1 | 4/2001 | Boothby et al. |
| 6,226,686 | B1 | 5/2001 | Rothschild et al. |
| 6,233,341 | B1 | 5/2001 | Riggins |
| 6,243,705 | B1 | 6/2001 | Kucala |
| 6,246,875 | B1 | 6/2001 | Seazholtz et al. |
| 6,247,135 | B1 | 6/2001 | Feague |
| 6,249,808 | B1 | 6/2001 | Seshadri |
| 6,256,666 | B1 | 7/2001 | Singhal |
| 6,263,201 | B1 | 7/2001 | Hashimoto et al. |
| 6,263,340 | B1 | 7/2001 | Green |
| 6,269,369 | B1 | 7/2001 | Robertson |
| 6,272,545 | B1 | 8/2001 | Flanagin et al. |
| 6,275,850 | B1 | 8/2001 | Beyda et al. |
| 6,289,212 | B1 | 9/2001 | Stein et al. |
| 6,292,904 | B1 | 9/2001 | Broomhall et al. |
| 6,295,541 | B1 | 9/2001 | Bodnar et al. |
| 6,300,947 | B1 | 10/2001 | Kanevsky |
| 6,304,881 | B1 | 10/2001 | Halim et al. |
| 6,308,201 | B1 | 10/2001 | Pivowar et al. |
| 6,317,594 | B1 | 11/2001 | Gossman et al. |
| 6,320,943 | B1 | 11/2001 | Borland |
| 6,324,541 | B1 | 11/2001 | de l'Etraz et al. |
| 6,324,542 | B1 | 11/2001 | Wright, Jr. et al. |
| 6,324,544 | B1 | 11/2001 | Alam et al. |
| 6,324,587 | B1 | 11/2001 | Trenbeath et al. |
| 6,327,586 | B1 | 12/2001 | Kisiel |
| 6,336,117 | B1 | 1/2002 | Massarani |
| 6,356,937 | B1 | 3/2002 | Montville et al. |
| 6,363,352 | B1 | 3/2002 | Dailey et al. |
| 6,370,566 | B2 | 4/2002 | Discolo et al. |
| 6,377,810 | B1 | 4/2002 | Geiger et al. |
| 6,380,959 | B1 | 4/2002 | Wang et al. |
| 6,389,455 | B1 | 5/2002 | Fuisz |
| 6,389,457 | B1 | 5/2002 | Lazaridis et al. |
| 6,397,057 | B1 | 5/2002 | Malackowski et al. |
| 6,397,230 | B1 | 5/2002 | Carmel et al. |
| 6,401,104 | B1 | 6/2002 | LaRue et al. |
| 6,401,112 | B1 | 6/2002 | Boyer et al. |
| 6,401,113 | B1 | 6/2002 | Lazaridis et al. |
| 6,405,197 | B2 | 6/2002 | Gilmour |
| 6,411,696 | B1 | 6/2002 | Iverson et al. |
| 6,415,031 | B1 | 7/2002 | Colligan et al. |
| 6,418,308 | B1 | 7/2002 | Heinonen et al. |
| 6,421,669 | B1 | 7/2002 | Gilmour et al. |
| 6,421,781 | B1 | 7/2002 | Fox et al. |
| 6,430,602 | B1 | 8/2002 | Kay et al. |
| 6,438,585 | B2 | 8/2002 | Mousseau et al. |
| 6,438,612 | B1 | 8/2002 | Ylonen et al. |
| 6,442,589 | B1 | 8/2002 | Takahashi et al. |
| 6,442,637 | B1 | 8/2002 | Hawkins et al. |
| 6,446,118 | B1 | 9/2002 | Gottlieb |
| 6,463,463 | B1 | 10/2002 | Godfrey et al. |
| 6,463,464 | B1 | 10/2002 | Lazaridis et al. |
| 6,487,557 | B1 | 11/2002 | Nagatomo |
| 6,487,560 | B1 | 11/2002 | LaRue et al. |
| 6,490,353 | B1 | 12/2002 | Tan |
| 6,496,802 | B1 | 12/2002 | van Zoest et al. |
| 6,499,054 | B1 | 12/2002 | Hesselink et al. |
| 6,505,214 | B1 | 1/2003 | Sherman et al. |
| 6,516,327 | B1 | 2/2003 | Zondervan et al. |
| 6,526,506 | B1 | 2/2003 | Lewis |
| 6,529,908 | B1 | 3/2003 | Piett et al. |
| 6,532,446 | B1 | 3/2003 | King |
| 6,535,892 | B1 | 3/2003 | LaRue et al. |
| 6,546,005 | B1 | 4/2003 | Berkley et al. |
| 6,549,939 | B1 | 4/2003 | Ford et al. |
| 6,556,217 | B1 | 4/2003 | Makipaa et al. |
| 6,593,944 | B1 | 7/2003 | Nicolas et al. |
| 6,601,026 | B2 | 7/2003 | Appelt et al. |
| 6,615,253 | B1 | 9/2003 | Bowman-Amuah |
| 6,618,710 | B1 | 9/2003 | Zondervan et al. |
| 6,621,892 | B1 | 9/2003 | Banister et al. |
| 6,625,621 | B2 | 9/2003 | Tan et al. |
| 6,636,482 | B2 | 10/2003 | Cloonan et al. |
| 6,639,693 | B1 | 10/2003 | Ejiri et al. |
| 6,640,097 | B2 | 10/2003 | Corrigan et al. |
| 6,640,244 | B1 | 10/2003 | Bowman-Amuah |
| 6,640,249 | B1 | 10/2003 | Bowman-Amuah |
| 6,643,650 | B1 | 11/2003 | Slaughter et al. |
| 6,643,688 | B1 | 11/2003 | Fuisz |
| 6,647,384 | B2 | 11/2003 | Gilmour |
| 6,650,890 | B1 | 11/2003 | Irlam et al. |
| 6,662,016 | B1 | 12/2003 | Buckham et al. |
| 6,668,046 | B1 | 12/2003 | Albal |
| 6,671,695 | B2 | 12/2003 | McFadden |
| 6,671,700 | B1 | 12/2003 | Creemer et al. |
| 6,671,702 | B2 | 12/2003 | Kruglikov et al. |
| 6,671,757 | B1 | 12/2003 | Multer et al. |
| 6,694,336 | B1 | 2/2004 | Multer et al. |
| 6,697,807 | B2 | 2/2004 | McGeachie |
| 6,701,378 | B1 | 3/2004 | Gilhuly et al. |
| 6,707,801 | B2 | 3/2004 | Hsu |
| 6,708,221 | B1 | 3/2004 | Mendez et al. |
| 6,714,965 | B1 | 3/2004 | Kakuta et al. |
| 6,721,787 | B1 | 4/2004 | Hiscock |
| 6,727,917 | B1 | 4/2004 | Chew et al. |
| 6,728,530 | B1 | 4/2004 | Heinonen et al. |
| 6,728,786 | B2 | 4/2004 | Hawkins et al. |
| 6,732,101 | B1 | 5/2004 | Cook |
| 6,732,158 | B1 | 5/2004 | Hesselink et al. |
| 6,735,591 | B2 | 5/2004 | Khan |
| 6,741,232 | B1 | 5/2004 | Siedlikowski et al. |
| 6,741,855 | B1 | 5/2004 | Martin et al. |
| 6,742,015 | B1 | 5/2004 | Bowman-Amuah |
| 6,745,024 | B1 | 6/2004 | DeJaco et al. |
| 6,745,326 | B1 | 6/2004 | Wary |
| 6,756,882 | B2 | 6/2004 | Benes et al. |
| 6,757,362 | B1 | 6/2004 | Cooper et al. |
| 6,757,696 | B2 | 6/2004 | Multer et al. |
| 6,760,916 | B2 | 7/2004 | Holtz et al. |
| 6,771,294 | B1 | 8/2004 | Pulli et al. |

| | | |
|---|---|---|
| 6,775,362 B1 | 8/2004 | Ransom |
| 6,779,019 B1 | 8/2004 | Mousseau et al. |
| 6,782,409 B1 | 8/2004 | Yoshida |
| 6,785,868 B1 | 8/2004 | Raff |
| 6,785,906 B1 | 8/2004 | Gaughan et al. |
| 6,799,190 B1 | 9/2004 | Boothby |
| 6,804,707 B1 | 10/2004 | Ronning |
| 6,816,849 B1 | 11/2004 | Halt, Jr. |
| 6,820,088 B1 | 11/2004 | Hind et al. |
| 6,820,204 B1 | 11/2004 | Desai et al. |
| 6,829,487 B2 | 12/2004 | Eiden et al. |
| 6,834,195 B2 | 12/2004 | Brandenberg et al. |
| 6,847,974 B2 | 1/2005 | Wachtel |
| 6,850,757 B2 | 2/2005 | Watanabe et al. |
| 6,859,212 B2 | 2/2005 | Kumar et al. |
| 6,867,774 B1 | 3/2005 | Halmshaw et al. |
| 6,868,447 B1 | 3/2005 | Slaughter et al. |
| 6,871,220 B1 | 3/2005 | Rajan et al. |
| 6,873,688 B1 | 3/2005 | Aarnio |
| 6,879,985 B2 | 4/2005 | Deguchi et al. |
| 6,886,030 B1 | 4/2005 | Easterbrook et al. |
| 6,892,070 B2 | 5/2005 | Warrier et al. |
| 6,892,196 B1 | 5/2005 | Hughes |
| 6,895,394 B1 | 5/2005 | Kremer et al. |
| 6,895,558 B1 | 5/2005 | Loveland |
| 6,898,427 B1 | 5/2005 | Griffith et al. |
| 6,922,547 B2 | 7/2005 | O'Neill et al. |
| 6,922,721 B1 | 7/2005 | Minborg et al. |
| 6,925,477 B1 | 8/2005 | Champagne et al. |
| 6,931,529 B2 | 8/2005 | Kunzinger |
| 6,938,079 B1 | 8/2005 | Anderson et al. |
| 6,944,447 B2 | 9/2005 | Portman et al. |
| 6,944,662 B2 | 9/2005 | Devine et al. |
| 6,947,770 B2 | 9/2005 | Rydbeck |
| 6,957,397 B1 | 10/2005 | Hawkins et al. |
| 6,965,917 B1 | 11/2005 | Aloni et al. |
| 6,966,058 B2 | 11/2005 | Earl et al. |
| 6,968,175 B2 | 11/2005 | Raivisto et al. |
| 6,970,879 B1 | 11/2005 | Gilmour |
| 6,972,682 B2 | 12/2005 | Lareau et al. |
| 6,973,299 B2 | 12/2005 | Apfel |
| 6,981,041 B2 | 12/2005 | Araujo et al. |
| 6,981,047 B2 | 12/2005 | Hanson et al. |
| 6,985,983 B2 | 1/2006 | Pellegrino et al. |
| 6,986,061 B1 | 1/2006 | Kunzinger |
| 6,987,734 B2 | 1/2006 | Hundemer |
| 6,990,472 B2 | 1/2006 | Rosenhaft et al. |
| 6,993,326 B2 | 1/2006 | Link, II et al. |
| 6,993,327 B2 | 1/2006 | Mathis |
| 6,999,753 B2 | 2/2006 | Beckmann et al. |
| 7,026,984 B1 | 4/2006 | Thandu et al. |
| 7,032,242 B1 | 4/2006 | Grabelsky et al. |
| 7,035,630 B2 | 4/2006 | Knowles |
| 7,046,993 B2 | 5/2006 | Haaramo et al. |
| 7,047,202 B2 | 5/2006 | Jaipuria et al. |
| 7,062,024 B2 | 6/2006 | Kreckel et al. |
| 7,069,308 B2 | 6/2006 | Abrams |
| 7,072,678 B2 | 7/2006 | Allison |
| 7,079,499 B1 | 7/2006 | Akhtar et al. |
| 7,082,316 B2 | 7/2006 | Eiden et al. |
| 7,085,365 B2 | 8/2006 | Kauppinen |
| 7,096,030 B2 | 8/2006 | Huomo |
| 7,100,821 B2 | 9/2006 | Rasti |
| 7,103,432 B2 | 9/2006 | Drader et al. |
| 7,120,692 B2 | 10/2006 | Hesselink et al. |
| 7,120,928 B2 | 10/2006 | Sheth et al. |
| 7,130,839 B2 | 10/2006 | Boreham et al. |
| 7,136,645 B2 | 11/2006 | Hanson et al. |
| 7,139,555 B2 | 11/2006 | Apfel |
| 7,139,565 B2 | 11/2006 | Fiatal et al. |
| 7,140,549 B2 | 11/2006 | de Jong |
| 7,146,645 B1 | 12/2006 | Hellsten et al. |
| 7,149,780 B2 | 12/2006 | Quine et al. |
| 7,149,789 B2 | 12/2006 | Slivka et al. |
| 7,149,959 B1 | 12/2006 | Jones et al. |
| 7,162,241 B2 | 1/2007 | Kim et al. |
| 7,165,727 B2 | 1/2007 | de Jong |
| 7,172,118 B2 | 2/2007 | Urken |
| 7,181,228 B2 | 2/2007 | Boesch |
| 7,184,790 B2 | 2/2007 | Dorenbosch et al. |
| 7,185,362 B2 * | 2/2007 | Hawkes et al. ............ 726/4 |
| 7,194,273 B2 | 3/2007 | Vaudreuil |
| 7,200,390 B1 | 4/2007 | Henager et al. |
| 7,203,733 B1 | 4/2007 | Bern |
| 7,206,806 B2 | 4/2007 | Pineau |
| 7,209,757 B2 | 4/2007 | Naghian et al. |
| 7,219,222 B1 | 5/2007 | Durbin et al. |
| 7,224,957 B2 | 5/2007 | Spector |
| 7,231,206 B2 | 6/2007 | Cudak et al. |
| 7,233,795 B1 | 6/2007 | Ryden |
| 7,234,111 B2 | 6/2007 | Chu et al. |
| 7,239,877 B2 | 7/2007 | Corneille et al. |
| 7,240,095 B1 | 7/2007 | Lewis |
| 7,242,680 B2 | 7/2007 | Gallant |
| 7,245,926 B2 | 7/2007 | Liao et al. |
| 7,257,391 B2 | 8/2007 | Burgess et al. |
| 7,257,639 B1 | 8/2007 | Li et al. |
| 7,259,666 B1 | 8/2007 | Hermsmeyer et al. |
| 7,260,552 B2 | 8/2007 | Riera Jorba et al. |
| 7,260,590 B1 | 8/2007 | Williams |
| 7,272,830 B2 | 9/2007 | de Jong |
| 7,277,408 B2 | 10/2007 | Sorsa |
| 7,289,792 B1 | 10/2007 | Turunen |
| 7,289,964 B1 | 10/2007 | Bowman-Amuah |
| 7,289,971 B1 | 10/2007 | O'Neil et al. |
| 7,293,107 B1 | 11/2007 | Hanson et al. |
| 7,295,853 B2 | 11/2007 | Jin et al. |
| 7,305,700 B2 * | 12/2007 | Boynton et al. ............ 726/4 |
| 7,310,350 B1 | 12/2007 | Shao et al. |
| 7,310,729 B2 | 12/2007 | Gordon et al. |
| 7,349,871 B2 | 3/2008 | Labrou et al. |
| 7,359,720 B2 | 4/2008 | Hartmaier et al. |
| 7,373,386 B2 | 5/2008 | Gardner et al. |
| 7,374,099 B2 | 5/2008 | de Jong |
| 7,376,701 B2 | 5/2008 | Bhargava et al. |
| 7,382,879 B1 | 6/2008 | Miller |
| 7,388,950 B2 | 6/2008 | Elsey et al. |
| 7,389,412 B2 | 6/2008 | Sharma et al. |
| 7,392,483 B2 | 6/2008 | Wong et al. |
| 7,395,329 B1 | 7/2008 | Holt et al. |
| 7,430,609 B2 | 9/2008 | Brown et al. |
| 7,441,271 B2 | 10/2008 | Fiatal et al. |
| 7,461,071 B2 | 12/2008 | Fitzpatrick et al. |
| 7,465,231 B2 | 12/2008 | Lewin et al. |
| 7,469,125 B2 | 12/2008 | Nurmi |
| 7,483,036 B2 | 1/2009 | Moore |
| 7,499,537 B2 | 3/2009 | Elsey et al. |
| 7,502,615 B2 | 3/2009 | Wilhoite et al. |
| 7,519,042 B2 | 4/2009 | Gorday et al. |
| 7,532,571 B1 | 5/2009 | Price et al. |
| 7,539,665 B2 | 5/2009 | Mendez |
| 7,551,900 B2 | 6/2009 | Kang et al. |
| 7,567,575 B2 | 7/2009 | Chen et al. |
| 7,574,208 B2 | 8/2009 | Hanson et al. |
| 7,575,171 B2 | 8/2009 | Lev |
| 7,587,482 B2 | 9/2009 | Henderson et al. |
| 7,587,608 B2 * | 9/2009 | Haller et al. ............ 713/182 |
| 7,593,714 B2 | 9/2009 | Schultz et al. |
| 7,596,608 B2 | 9/2009 | Alexander et al. |
| 7,643,818 B2 | 1/2010 | Backholm et al. |
| 7,644,166 B2 | 1/2010 | Appelman et al. |
| 7,672,439 B2 | 3/2010 | Appelman et al. |
| 7,680,281 B2 | 3/2010 | Fiatal et al. |
| 7,689,664 B2 | 3/2010 | Karlberg |
| 7,693,944 B2 | 4/2010 | Appelman et al. |
| 7,706,781 B2 | 4/2010 | Backholm et al. |
| 7,752,633 B1 | 7/2010 | Fleming |
| 7,757,956 B2 | 7/2010 | Koenck et al. |
| 7,769,395 B2 | 8/2010 | Fiatal et al. |
| 7,769,400 B2 | 8/2010 | Backholm et al. |
| 7,796,742 B1 | 9/2010 | Sutaria et al. |
| 7,797,064 B2 | 9/2010 | Loomis et al. |
| 7,827,597 B2 * | 11/2010 | Boynton et al. ............ 726/4 |
| 7,853,563 B2 | 12/2010 | Alvarado et al. |
| 7,877,703 B1 | 1/2011 | Fleming |
| 7,917,505 B2 | 3/2011 | van Gent et al. |
| 7,921,167 B2 | 4/2011 | Shroff et al. |
| 8,010,082 B2 | 8/2011 | Sutaria et al. |

| | | | | | | |
|---|---|---|---|---|---|---|
| 8,064,583 | B1 | 11/2011 | Sutaria et al. | 2003/0065739 A1 | 4/2003 | Shnier |
| 8,069,166 | B2 | 11/2011 | Alvarado et al. | 2003/0065802 A1 | 4/2003 | Vitikainen et al. |
| 8,078,158 | B2 | 12/2011 | Backholm | 2003/0070061 A1 | 4/2003 | Wong et al. |
| 2001/0009025 | A1* | 7/2001 | Ahonen ............... 713/161 | 2003/0072451 A1 | 4/2003 | Pimentel et al. |
| 2001/0010046 | A1 | 7/2001 | Muyres et al. | 2003/0078880 A1 | 4/2003 | Alley et al. |
| 2001/0013069 | A1 | 8/2001 | Shah | 2003/0084165 A1 | 5/2003 | Kjellberg et al. |
| 2001/0023414 | A1 | 9/2001 | Kumar et al. | 2003/0088629 A1 | 5/2003 | Berkowitz et al. |
| 2001/0032254 | A1 | 10/2001 | Hawkins | 2003/0093691 A1* | 5/2003 | Simon et al. .............. 713/201 |
| 2001/0034225 | A1 | 10/2001 | Gupte et al. | 2003/0097381 A1 | 5/2003 | Detweiler et al. |
| 2001/0034244 | A1 | 10/2001 | Calder et al. | 2003/0100321 A1 | 5/2003 | Rao et al. |
| 2001/0037453 | A1 | 11/2001 | Mitty et al. | 2003/0100326 A1 | 5/2003 | Grube et al. |
| 2001/0039191 | A1 | 11/2001 | Maierhofer | 2003/0117432 A1 | 6/2003 | Kautto-Kiovula et al. |
| 2001/0041566 | A1 | 11/2001 | Xanthos et al. | 2003/0120685 A1 | 6/2003 | Duncombe et al. |
| 2001/0042009 | A1 | 11/2001 | Montague | 2003/0125023 A1 | 7/2003 | Fishler |
| 2001/0042099 | A1 | 11/2001 | Peng | 2003/0126216 A1 | 7/2003 | Avila et al. |
| 2001/0043148 | A1 | 11/2001 | Stewart | 2003/0130984 A1 | 7/2003 | Quinlan et al. |
| 2002/0002478 | A1 | 1/2002 | Swart et al. | 2003/0146934 A1 | 8/2003 | Bailey et al. |
| 2002/0002591 | A1 | 1/2002 | Ketola | 2003/0153338 A1 | 8/2003 | Herz et al. |
| 2002/0007303 | A1 | 1/2002 | Brookler et al. | 2003/0154212 A1 | 8/2003 | Schirmer et al. |
| 2002/0013727 | A1 | 1/2002 | Lee | 2003/0156146 A1 | 8/2003 | Suomela et al. |
| 2002/0019225 | A1 | 2/2002 | Miyashita | 2003/0157947 A1 | 8/2003 | Fiatal et al. |
| 2002/0019812 | A1 | 2/2002 | Board et al. | 2003/0169262 A1 | 9/2003 | Lavelle et al. |
| 2002/0035556 | A1 | 3/2002 | Shah et al. | 2003/0177281 A1 | 9/2003 | McQuillan et al. |
| 2002/0035617 | A1 | 3/2002 | Lynch et al. | 2003/0182431 A1* | 9/2003 | Sturniolo et al. .............. 709/227 |
| 2002/0038253 | A1 | 3/2002 | Seaman et al. | 2003/0208529 A1 | 11/2003 | Pendyala et al. |
| 2002/0042875 | A1 | 4/2002 | Shukla | 2003/0208559 A1 | 11/2003 | Velline et al. |
| 2002/0049828 | A1 | 4/2002 | Pekarek-Kostka | 2003/0211845 A1 | 11/2003 | Lohtia et al. |
| 2002/0053078 | A1 | 5/2002 | Holtz et al. | 2003/0217098 A1 | 11/2003 | Bobde et al. |
| 2002/0055351 | A1 | 5/2002 | Elsey et al. | 2003/0217142 A1 | 11/2003 | Bobde et al. |
| 2002/0059201 | A1 | 5/2002 | Work | 2003/0223554 A1 | 12/2003 | Zhang |
| 2002/0059457 | A1 | 5/2002 | Ballard et al. | 2003/0227745 A1 | 12/2003 | Khoo |
| 2002/0068559 | A1 | 6/2002 | Sharma et al. | 2003/0235308 A1 | 12/2003 | Boynton et al. |
| 2002/0073207 | A1 | 6/2002 | Widger et al. | 2003/0236981 A1 | 12/2003 | Marmigere et al. |
| 2002/0077077 | A1 | 6/2002 | Rezvani et al. | 2004/0002324 A1 | 1/2004 | Juntunen et al. |
| 2002/0077084 | A1 | 6/2002 | Zellner et al. | 2004/0006630 A1 | 1/2004 | Friend et al. |
| 2002/0078384 | A1 | 6/2002 | Hippelainen | 2004/0024795 A1 | 2/2004 | Hind et al. |
| 2002/0087679 | A1 | 7/2002 | Pulley et al. | 2004/0024892 A1 | 2/2004 | Creswell et al. |
| 2002/0089542 | A1 | 7/2002 | Imamura | 2004/0027326 A1 | 2/2004 | Hays et al. |
| 2002/0091921 | A1 | 7/2002 | Kunzinger | 2004/0027375 A1 | 2/2004 | Ellis et al. |
| 2002/0095319 | A1 | 7/2002 | Swart et al. | 2004/0027378 A1 | 2/2004 | Hays et al. |
| 2002/0095328 | A1 | 7/2002 | Swart et al. | 2004/0043770 A1 | 3/2004 | Amit et al. |
| 2002/0095391 | A1 | 7/2002 | Swart et al. | 2004/0049599 A1 | 3/2004 | Friend et al. |
| 2002/0095399 | A1 | 7/2002 | Devine et al. | 2004/0051715 A1 | 3/2004 | Brokenshire et al. |
| 2002/0098855 | A1 | 7/2002 | Hartmaier et al. | 2004/0054739 A1 | 3/2004 | Friend et al. |
| 2002/0099613 | A1 | 7/2002 | Swart et al. | 2004/0064445 A1 | 4/2004 | Pfleging et al. |
| 2002/0101975 | A1 | 8/2002 | Tiburtius et al. | 2004/0064488 A1 | 4/2004 | Sinha |
| 2002/0116499 | A1 | 8/2002 | Enns et al. | 2004/0068698 A1 | 4/2004 | Wu et al. |
| 2002/0116501 | A1 | 8/2002 | Ho et al. | 2004/0073476 A1 | 4/2004 | Donahue et al. |
| 2002/0120766 | A1 | 8/2002 | Okajima et al. | 2004/0073651 A1 | 4/2004 | Beaulieu et al. |
| 2002/0120779 | A1 | 8/2002 | Teeple et al. | 2004/0075675 A1 | 4/2004 | Raivisto et al. |
| 2002/0126701 | A1 | 9/2002 | Requena | 2004/0075695 A1 | 4/2004 | Chew et al. |
| 2002/0133504 | A1 | 9/2002 | Vlahos et al. | 2004/0078814 A1 | 4/2004 | Allen |
| 2002/0144109 | A1 | 10/2002 | Benantar et al. | 2004/0080515 A1 | 4/2004 | Hagiwara |
| 2002/0146129 | A1 | 10/2002 | Kaplan | 2004/0082346 A1 | 4/2004 | Skytt et al. |
| 2002/0152379 | A1 | 10/2002 | Gefwert et al. | 2004/0098625 A1 | 5/2004 | Lagadec et al. |
| 2002/0155848 | A1 | 10/2002 | Suryanarayana | 2004/0103147 A1 | 5/2004 | Flesher et al. |
| 2002/0158908 | A1 | 10/2002 | Vaajala et al. | 2004/0120323 A1 | 6/2004 | Viikari et al. |
| 2002/0161587 | A1 | 10/2002 | Pitts et al. | 2004/0123304 A1 | 6/2004 | Black et al. |
| 2002/0161925 | A1 | 10/2002 | Munger et al. | 2004/0128375 A1 | 7/2004 | Rockwell |
| 2002/0161928 | A1 | 10/2002 | Ndili | 2004/0133626 A1 | 7/2004 | Herrero et al. |
| 2002/0164977 | A1 | 11/2002 | Link, II et al. | 2004/0141011 A1 | 7/2004 | Smethers et al. |
| 2002/0167484 | A1 | 11/2002 | Hatanaka et al. | 2004/0147248 A1 | 7/2004 | Will |
| 2002/0174189 | A1 | 11/2002 | Peng | 2004/0147262 A1 | 7/2004 | Lescuyer et al. |
| 2002/0186848 | A1 | 12/2002 | Shaik | 2004/0158611 A1 | 8/2004 | Daniell et al. |
| 2002/0188940 | A1 | 12/2002 | Breckner et al. | 2004/0167966 A1 | 8/2004 | Lee et al. |
| 2002/0193094 | A1 | 12/2002 | Lawless et al. | 2004/0170257 A1 | 9/2004 | Gross et al. |
| 2002/0194209 | A1 | 12/2002 | Bolosky et al. | 2004/0172481 A1 | 9/2004 | Engstrom |
| 2002/0198027 | A1 | 12/2002 | Rydbeck | 2004/0176128 A1 | 9/2004 | Grabelsky et al. |
| 2003/0005151 | A1 | 1/2003 | Ullman et al. | 2004/0177369 A1 | 9/2004 | Akins |
| 2003/0022662 | A1 | 1/2003 | Mittal | 2004/0179513 A1 | 9/2004 | Smith et al. |
| 2003/0023975 | A1 | 1/2003 | Schrader et al. | 2004/0181550 A1 | 9/2004 | Warsta et al. |
| 2003/0028430 | A1 | 2/2003 | Zimmerman | 2004/0186902 A1 | 9/2004 | Stewart |
| 2003/0028441 | A1 | 2/2003 | Barsness et al. | 2004/0189610 A1 | 9/2004 | Friend |
| 2003/0050041 | A1 | 3/2003 | Wu | 2004/0199497 A1 | 10/2004 | Timmons |
| 2003/0054810 | A1 | 3/2003 | Chen et al. | 2004/0199582 A1 | 10/2004 | Kucharewski et al. |
| 2003/0056096 | A1 | 3/2003 | Albert et al. | 2004/0205248 A1 | 10/2004 | Little et al. |
| 2003/0060188 | A1 | 3/2003 | Gidron et al. | 2004/0205330 A1 | 10/2004 | Godfrey et al. |
| 2003/0063120 | A1 | 4/2003 | Wong et al. | 2004/0209602 A1 | 10/2004 | Joyce et al. |
| 2003/0065738 | A1 | 4/2003 | Yang et al. | 2004/0210639 A1 | 10/2004 | Ben-Yoseph et al. |

| Publication No. | Date | Inventor |
|---|---|---|
| 2004/0230619 A1 | 11/2004 | Blanco et al. |
| 2004/0233930 A1 | 11/2004 | Colby |
| 2004/0236792 A1 | 11/2004 | Celik |
| 2004/0252816 A1 | 12/2004 | Nicolas |
| 2004/0255126 A1 | 12/2004 | Reith |
| 2004/0258231 A1 | 12/2004 | Elsey et al. |
| 2004/0259535 A1 | 12/2004 | Elsey et al. |
| 2004/0259537 A1 | 12/2004 | Ackley |
| 2004/0266364 A1 | 12/2004 | Nguyen et al. |
| 2004/0268148 A1 | 12/2004 | Karjala et al. |
| 2005/0002501 A1 | 1/2005 | Elsey et al. |
| 2005/0002508 A1 | 1/2005 | Elsey et al. |
| 2005/0002509 A1 | 1/2005 | Elsey et al. |
| 2005/0002510 A1 | 1/2005 | Elsey et al. |
| 2005/0010694 A1 | 1/2005 | Ma et al. |
| 2005/0015432 A1 | 1/2005 | Cohen |
| 2005/0021750 A1 | 1/2005 | Abrams |
| 2005/0022182 A1 | 1/2005 | Mittal |
| 2005/0027591 A9 | 2/2005 | Gailey et al. |
| 2005/0027716 A1 | 2/2005 | Apfel |
| 2005/0033812 A1 | 2/2005 | McCarthy et al. |
| 2005/0037741 A1 | 2/2005 | Gilbert |
| 2005/0038707 A1 | 2/2005 | Roever et al. |
| 2005/0038724 A1 | 2/2005 | Roever et al. |
| 2005/0038863 A1 | 2/2005 | Onyon et al. |
| 2005/0041793 A1 | 2/2005 | Fulton et al. |
| 2005/0044144 A1 | 2/2005 | Malik et al. |
| 2005/0055578 A1 | 3/2005 | Wright et al. |
| 2005/0063544 A1 | 3/2005 | Uusitalo et al. |
| 2005/0071674 A1 | 3/2005 | Chou et al. |
| 2005/0076136 A1 | 4/2005 | Cho et al. |
| 2005/0076241 A1 | 4/2005 | Appelman |
| 2005/0086540 A1 | 4/2005 | Gunter et al. |
| 2005/0094625 A1 | 5/2005 | Bouat |
| 2005/0097225 A1 | 5/2005 | Glatt et al. |
| 2005/0097570 A1 | 5/2005 | Bomers |
| 2005/0101307 A1 | 5/2005 | Brugge et al. |
| 2005/0102257 A1 | 5/2005 | Onyon et al. |
| 2005/0102328 A1 | 5/2005 | Ring et al. |
| 2005/0108427 A1 | 5/2005 | Datta |
| 2005/0117606 A1 | 6/2005 | Kim |
| 2005/0120082 A1 | 6/2005 | Hesselink et al. |
| 2005/0120084 A1 | 6/2005 | Hu et al. |
| 2005/0122333 A1 | 6/2005 | Sumanaweera et al. |
| 2005/0124332 A1 | 6/2005 | Clark et al. |
| 2005/0138111 A1 | 6/2005 | Aton et al. |
| 2005/0144219 A1 | 6/2005 | Terada |
| 2005/0154698 A1 | 7/2005 | Ikezawa et al. |
| 2005/0154796 A1 | 7/2005 | Forsyth |
| 2005/0155027 A1 | 7/2005 | Wei |
| 2005/0164721 A1 | 7/2005 | Eric Yeh et al. |
| 2005/0183143 A1 | 8/2005 | Anderholm et al. |
| 2005/0188038 A1 | 8/2005 | Yabe |
| 2005/0193036 A1 | 9/2005 | Phillips et al. |
| 2005/0203966 A1 | 9/2005 | Labrou et al. |
| 2005/0210104 A1 | 9/2005 | Torvinen |
| 2005/0228812 A1 | 10/2005 | Hansmann et al. |
| 2005/0232295 A1 | 10/2005 | Young |
| 2005/0234860 A1 | 10/2005 | Roever et al. |
| 2005/0235214 A1 | 10/2005 | Shimizu et al. |
| 2005/0246139 A1 | 11/2005 | Rivenbark et al. |
| 2005/0248526 A1 | 11/2005 | Twerdahl et al. |
| 2005/0251555 A1 | 11/2005 | Little |
| 2005/0254443 A1 | 11/2005 | Campbell et al. |
| 2005/0262220 A1 | 11/2005 | Ecklund et al. |
| 2005/0273804 A1 | 12/2005 | Preisman |
| 2005/0278307 A1 | 12/2005 | Battagin et al. |
| 2005/0278641 A1 | 12/2005 | Mansour et al. |
| 2005/0278647 A1 | 12/2005 | Leavitt et al. |
| 2005/0288006 A1 | 12/2005 | Apfel |
| 2006/0012672 A1 | 1/2006 | Schrader et al. |
| 2006/0020525 A1 | 1/2006 | Borelli et al. |
| 2006/0020580 A1 | 1/2006 | Dettinger et al. |
| 2006/0020804 A1 | 1/2006 | Schleifer et al. |
| 2006/0020947 A1 | 1/2006 | Hallamaa et al. |
| 2006/0021023 A1 | 1/2006 | Stewart et al. |
| 2006/0022048 A1 | 2/2006 | Johnson |
| 2006/0026580 A1 | 2/2006 | Cabillic et al. |
| 2006/0029062 A1 | 2/2006 | Rao et al. |
| 2006/0029063 A1 | 2/2006 | Rao et al. |
| 2006/0029064 A1 | 2/2006 | Rao et al. |
| 2006/0031114 A1 | 2/2006 | Zommers |
| 2006/0031365 A1 | 2/2006 | Kay et al. |
| 2006/0031428 A1 | 2/2006 | Wikman |
| 2006/0031785 A1 | 2/2006 | Raciborski |
| 2006/0037071 A1 | 2/2006 | Rao et al. |
| 2006/0046686 A1 | 3/2006 | Hawkins et al. |
| 2006/0047844 A1 | 3/2006 | Deng |
| 2006/0048061 A1 | 3/2006 | Forlenza et al. |
| 2006/0052091 A1 | 3/2006 | Onyon et al. |
| 2006/0059495 A1 | 3/2006 | Spector |
| 2006/0063544 A1 | 3/2006 | Zhao et al. |
| 2006/0069686 A1 | 3/2006 | Beyda et al. |
| 2006/0069687 A1 | 3/2006 | Cui et al. |
| 2006/0073810 A1 | 4/2006 | Pyhalammi et al. |
| 2006/0074951 A1 | 4/2006 | Beier et al. |
| 2006/0084410 A1 | 4/2006 | Sutaria et al. |
| 2006/0085503 A1 | 4/2006 | Stoye et al. |
| 2006/0093135 A1 | 5/2006 | Fiatal et al. |
| 2006/0099969 A1 | 5/2006 | Staton et al. |
| 2006/0112177 A1 | 5/2006 | Barkley et al. |
| 2006/0132495 A1 | 6/2006 | Anderson |
| 2006/0141962 A1 | 6/2006 | Forbes et al. |
| 2006/0143464 A1 | 6/2006 | Ananthanarayanan et al. |
| 2006/0149591 A1 | 7/2006 | Hanf et al. |
| 2006/0149843 A1 | 7/2006 | Rhoads et al. |
| 2006/0149970 A1 | 7/2006 | Imazu |
| 2006/0165226 A1 | 7/2006 | Ernst et al. |
| 2006/0168043 A1 | 7/2006 | Eisenberger et al. |
| 2006/0168164 A1 | 7/2006 | Lemson et al. |
| 2006/0179410 A1 | 8/2006 | Deeds |
| 2006/0188864 A1 | 8/2006 | Shah |
| 2006/0190428 A1 | 8/2006 | Jung et al. |
| 2006/0190984 A1 | 8/2006 | Heard et al. |
| 2006/0192014 A1 | 8/2006 | Hamilton et al. |
| 2006/0195570 A1 | 8/2006 | Zellner et al. |
| 2006/0212531 A1 | 9/2006 | Kikkawa et al. |
| 2006/0224629 A1 | 10/2006 | Alexander et al. |
| 2006/0230394 A1 | 10/2006 | Forth et al. |
| 2006/0240804 A1 | 10/2006 | Backholm et al. |
| 2006/0240805 A1 | 10/2006 | Backholm et al. |
| 2006/0242210 A1 | 10/2006 | Ring et al. |
| 2006/0242320 A1 | 10/2006 | Nettle et al. |
| 2006/0242607 A1 | 10/2006 | Hudson |
| 2006/0252435 A1 | 11/2006 | Henderson et al. |
| 2006/0253456 A1 | 11/2006 | Pacholec et al. |
| 2006/0259923 A1 | 11/2006 | Chiu |
| 2006/0265595 A1 | 11/2006 | Scottodiluzio |
| 2006/0277265 A1 | 12/2006 | Backholm et al. |
| 2006/0294071 A1 | 12/2006 | Weare et al. |
| 2007/0005738 A1 | 1/2007 | Alexion-Tiernan et al. |
| 2007/0011367 A1 | 1/2007 | Scott et al. |
| 2007/0019610 A1 | 1/2007 | Backholm et al. |
| 2007/0022118 A1 | 1/2007 | Layne |
| 2007/0027775 A1 | 2/2007 | Hwang |
| 2007/0027832 A1 | 2/2007 | Fiatal et al. |
| 2007/0027886 A1 | 2/2007 | Gent et al. |
| 2007/0027917 A1 | 2/2007 | Ariel et al. |
| 2007/0027920 A1 | 2/2007 | Alvarado et al. |
| 2007/0027921 A1 | 2/2007 | Alvarado et al. |
| 2007/0027930 A1 | 2/2007 | Alvarado et al. |
| 2007/0033531 A1 | 2/2007 | Marsh |
| 2007/0038567 A1 | 2/2007 | Allaire et al. |
| 2007/0038931 A1 | 2/2007 | Allaire et al. |
| 2007/0044041 A1 | 2/2007 | Beynon et al. |
| 2007/0049258 A1 | 3/2007 | Thibeault |
| 2007/0060196 A1 | 3/2007 | Sharma |
| 2007/0061393 A1 | 3/2007 | Moore |
| 2007/0067381 A1 | 3/2007 | Grant et al. |
| 2007/0067424 A1 | 3/2007 | Raciborski et al. |
| 2007/0078857 A1 | 4/2007 | Punaganti et al. |
| 2007/0078964 A1 | 4/2007 | East et al. |
| 2007/0105627 A1 | 5/2007 | Campbell |
| 2007/0116223 A1 | 5/2007 | Burke et al. |
| 2007/0118620 A1 | 5/2007 | Cartmell et al. |
| 2007/0130108 A1 | 6/2007 | Simpson et al. |
| 2007/0130217 A1 | 6/2007 | Linyard et al. |
| 2007/0156824 A1 | 7/2007 | Thompson |

| | | |
|---|---|---|
| 2007/0162514 A1 | 7/2007 | Civetta et al. |
| 2007/0167178 A1 | 7/2007 | Al-Harbi |
| 2007/0174433 A1 | 7/2007 | Mendez et al. |
| 2007/0175998 A1 | 8/2007 | Lev |
| 2007/0198698 A1 | 8/2007 | Boyd et al. |
| 2007/0220080 A1 | 9/2007 | Humphrey |
| 2007/0249365 A1 | 10/2007 | Jendbro |
| 2007/0250591 A1 | 10/2007 | Milic-Frayling et al. |
| 2007/0264993 A1 | 11/2007 | Hughes |
| 2007/0267492 A1 | 11/2007 | Maclaine Pont |
| 2007/0276925 A1 | 11/2007 | La Joie et al. |
| 2007/0276926 A1 | 11/2007 | LaJoie et al. |
| 2007/0290787 A1 | 12/2007 | Fiatal et al. |
| 2007/0293207 A1 | 12/2007 | Guedalia et al. |
| 2007/0293238 A1 | 12/2007 | Fiatal et al. |
| 2007/0294295 A1 | 12/2007 | Finkelstein et al. |
| 2008/0001717 A1 | 1/2008 | Fiatal |
| 2008/0009344 A1 | 1/2008 | Graham et al. |
| 2008/0032718 A1 | 2/2008 | Suresh |
| 2008/0037787 A1 | 2/2008 | Boynton et al. |
| 2008/0059308 A1 | 3/2008 | Gerken |
| 2008/0059398 A1 | 3/2008 | Tsutsui |
| 2008/0061142 A1 | 3/2008 | Howcroft et al. |
| 2008/0077506 A1 | 3/2008 | Rampell et al. |
| 2008/0077571 A1 | 3/2008 | Harris et al. |
| 2008/0086379 A1 | 4/2008 | Dion et al. |
| 2008/0103877 A1 | 5/2008 | Gerken |
| 2008/0125225 A1 | 5/2008 | Lazaridis |
| 2008/0130663 A1 | 6/2008 | Fridman et al. |
| 2008/0133326 A1 | 6/2008 | Goncalves et al. |
| 2008/0133641 A1 | 6/2008 | Gent et al. |
| 2008/0133708 A1 | 6/2008 | Alvarado et al. |
| 2008/0134292 A1 | 6/2008 | Ariel et al. |
| 2008/0140665 A1 | 6/2008 | Ariel et al. |
| 2008/0151817 A1 | 6/2008 | Fitchett et al. |
| 2008/0154870 A1 | 6/2008 | Evermann et al. |
| 2008/0155613 A1 | 6/2008 | Benya et al. |
| 2008/0192820 A1 | 8/2008 | Brooks et al. |
| 2008/0198995 A1 | 8/2008 | McGary et al. |
| 2008/0201362 A1 | 8/2008 | Multer et al. |
| 2008/0201751 A1 | 8/2008 | Ahmed et al. |
| 2008/0207182 A1 | 8/2008 | Maharajh et al. |
| 2008/0209491 A1 | 8/2008 | Hasek |
| 2008/0216094 A1 | 9/2008 | Anderson et al. |
| 2008/0233983 A1 | 9/2008 | Park et al. |
| 2008/0270379 A1 | 10/2008 | Ramakrishna |
| 2008/0298386 A1 | 12/2008 | Fiatal |
| 2008/0299956 A1 | 12/2008 | Bailey et al. |
| 2008/0313282 A1 | 12/2008 | Warila et al. |
| 2009/0012841 A1 | 1/2009 | Saft et al. |
| 2009/0016526 A1 | 1/2009 | Fiatal et al. |
| 2009/0019485 A1 | 1/2009 | Ellis et al. |
| 2009/0019532 A1 | 1/2009 | Jacobsen et al. |
| 2009/0031006 A1 | 1/2009 | Johnson |
| 2009/0054034 A1 | 2/2009 | Backholm et al. |
| 2009/0055353 A1 | 2/2009 | Meema |
| 2009/0063647 A1 | 3/2009 | Backholm et al. |
| 2009/0075683 A1 | 3/2009 | Backholm et al. |
| 2009/0110179 A1 | 4/2009 | Elsey et al. |
| 2009/0119266 A1 | 5/2009 | Fitzpatrick et al. |
| 2009/0125523 A1 | 5/2009 | Fitzpatrick et al. |
| 2009/0144632 A1 | 6/2009 | Mendez |
| 2009/0147008 A1 | 6/2009 | Do et al. |
| 2009/0149203 A1 | 6/2009 | Backholm et al. |
| 2009/0156178 A1 | 6/2009 | Elsey et al. |
| 2009/0157792 A1 | 6/2009 | Fiatal |
| 2009/0164433 A1 | 6/2009 | R. et al. |
| 2009/0164560 A1 | 6/2009 | Fiatal |
| 2009/0172565 A1 | 7/2009 | Jackson et al. |
| 2009/0181641 A1 | 7/2009 | Fiatal |
| 2009/0182500 A1 | 7/2009 | Dicke |
| 2009/0191903 A1 | 7/2009 | Fiatal |
| 2009/0193130 A1 | 7/2009 | Fiatal |
| 2009/0193338 A1 | 7/2009 | Fiatal |
| 2009/0221326 A1 | 9/2009 | Roussel et al. |
| 2009/0241180 A1 | 9/2009 | Fiatal |
| 2009/0248670 A1 | 10/2009 | Fiatal |
| 2009/0248794 A1 | 10/2009 | Helms et al. |
| 2009/0264138 A1 | 10/2009 | Kang et al. |
| 2009/0299817 A1 | 12/2009 | Fok et al. |
| 2009/0307133 A1 | 12/2009 | Holloway et al. |
| 2009/0318171 A1 | 12/2009 | Backholm et al. |
| 2009/0323678 A1 | 12/2009 | Wang |
| 2009/0325565 A1 | 12/2009 | Backholm |
| 2010/0057924 A1 | 3/2010 | Rauber et al. |
| 2010/0146107 A1 | 6/2010 | Fiatal |
| 2010/0174735 A1 | 7/2010 | Fiatal |
| 2010/0279662 A1 | 11/2010 | Kuusinen et al. |
| 2011/0138402 A1 | 6/2011 | Fleming |
| 2011/0165889 A1 | 7/2011 | Fiatal et al. |
| 2011/0179377 A1 | 7/2011 | Fleming |
| 2011/0190014 A1 | 8/2011 | Fiatal |
| 2011/0191474 A1 | 8/2011 | Fiatal |
| 2011/0201304 A1 | 8/2011 | Sutaria et al. |
| 2011/0207436 A1 | 8/2011 | van Gent et al. |
| 2011/0213898 A1 | 9/2011 | Fiatal et al. |
| 2011/0238772 A1 | 9/2011 | Fiatal |
| 2011/0246950 A1 | 10/2011 | Luna et al. |
| 2011/0252088 A1 | 10/2011 | Fiatal |
| 2011/0294463 A1 | 12/2011 | Fiatal |
| 2011/0294464 A1 | 12/2011 | Fiatal |

FOREIGN PATENT DOCUMENTS

| | | |
|---|---|---|
| EP | 1422899 A1 | 5/2004 |
| EP | 1466261 A1 | 10/2004 |
| EP | 1466435 A1 | 10/2004 |
| EP | 1815634 A1 | 8/2007 |
| EP | 1815652 A1 | 8/2007 |
| EP | 1817883 A1 | 8/2007 |
| FI | 117152 B1 | 6/2006 |
| FI | 118288 B1 | 9/2007 |
| FI | 119581 B1 | 12/2008 |
| JP | 4154233 A | 5/1992 |
| JP | 10-336372 A | 12/1998 |
| JP | 2001-218185 A | 8/2001 |
| JP | 2001-350718 A | 12/2001 |
| JP | 2001-356973 A | 12/2001 |
| JP | 2005-515664 A | 5/2005 |
| JP | 4386732 | 5/2005 |
| WO | WO-97/41661 A2 | 11/1997 |
| WO | WO-98/04257 A1 | 6/1998 |
| WO | WO-98/58322 A2 | 12/1998 |
| WO | WO-01/30130 A2 | 5/2001 |
| WO | WO-03/007570 A1 | 1/2003 |
| WO | WO-03/058483 A1 | 7/2003 |
| WO | WO-03/058879 A1 | 7/2003 |
| WO | WO-03/065701 A1 | 8/2003 |
| WO | WO-03/098890 A1 | 11/2003 |
| WO | WO-2004045171 A1 | 5/2004 |
| WO | WO-2005/015925 A2 | 2/2005 |
| WO | WO-2005/020108 A1 | 3/2005 |
| WO | WO-2006/045005 A2 | 4/2006 |
| WO | WO-2006/045102 A2 | 4/2006 |
| WO | WO-2006/053952 A1 | 5/2006 |
| WO | WO-2006/053954 A1 | 5/2006 |
| WO | WO-2006/058967 A1 | 6/2006 |
| WO | WO-2007/015725 A2 | 2/2007 |
| WO | WO-2007/015726 A1 | 2/2007 |
| WO | WO-2007/149526 A2 | 12/2007 |
| WO | WO-2007/149540 A2 | 12/2007 |
| WO | WO-2011126889 A2 | 10/2011 |

OTHER PUBLICATIONS

Android Developers, "Date," 10 pages, Oct. 27, 2011.
Augun, Audrey, "Integrating Lotus Notes With Enterprise Data," Lotus Notes Advisory, pp. 22-25, Jul.-Aug. 1996.
Balaban, Bob, "This Is Not Your Father's Basic: LotusScript in Notes Release 4," The View, vol. 1, Issue 5, 32 pages, Nov.-Dec. 1995.
Bedell, Doug, "Meeting Your New Best Friends Six Degrees Widens Your Contacts in Exchange for Sampling Web Sites," The Dallas Morning News, 4 pages, Oct. 27, 1998.
Bergman, Lawrence D. et al., "Programming-By-Demonstration for Behavior-Based User Interface Customization," IBM Research Report, RC23116, 5 pages, Feb. 20, 2004.
B'Far, Reza et al., "Designing Effective User Interfaces for Wireless Devices," Publication Unknown, 14 pages, Published prior to Feb. 23, 2006.

Blaney, Jeff, "You Can Take It With You—An Introduction to Mobile Computing With Notes R4," the View, vol. 2, Issue 1, 14 pages, Jan.-Feb. 1996.
Brown, Kevin et al., "Mastering Lotus Notes®," Sybex Inc., 996 pages, 1995.
"Chapter: About NotesPump," Publication Unknown, 480 pages, Published prior to Jan. 8, 2003.
"Chapter 13-1—Anatomy of a Note ID," Publication Unknown, 8 pages, Published prior to Jan. 8, 2003.
Cole, Barb et al., "Lotus Airs Notes-To-Database Integration Tool," Network World, 2 pages, Oct. 2, 1995.
"CR 3483 to Release 8 TS 25.331, Rev. 2," 3GPP TSG-RAN2 Meeting #64, Prague, Czech Republic, 11 pages, Nov. 10-14, 2008.
"CR 4100 to Release 8 TS 25.331, Rev. 1," 3GPP TSG-RAN WG2 Meeting #69, San Francisco, U.S., 6 pages, Feb. 22-26, 2010.
Dahl, Andrew, "Lotus Notes® 4 Administrator's Survival Guide," Sams Publishing, 64 pages, 1996.
Decker, Stefan et al., "The Social Semantic Desktop," Digital Enterprise Research Institute, DERI Technical Report 2004-05-02, 7 pages, May 2004.
European Patent Application No. EP 03705704.9, Supplementary European Search Report, 4 pages, Jun. 9, 2010.
European Patent Application No. EP 03707338.4, Supplementary European Search Report, 2 pages, Apr. 18, 2011.
Falkner, Mike, "How to Plan, Develop, and Implement Lotus Notes® in Your Organization," John Wiley & Sons, Inc., 539 pages, 1996.
Freeland, Pat et al., "Lotus Notes 3-3.1 for Dummies™," IDG Books Worldwide, 389 pages, 1994.
Frenkel, Garry, "Pumping for Info: Notes and Database Integration," Network Computing, 10 pages, May 1, 1996.
Gameline, Advertisement, 1 page, 1982.
Gewirtz, David, "Lotus Notes 3 Revealed!," Prima Publishing, 261 pages, 1994.
Grous, Paul J., "Creating and Managing a Web Site With Lotus Internotes Web Publisher," The View, vol. 1, Issue 4, 20 pages, Sep.-Oct. 1995.
GSM Association, "Network Efficiency Task Force Fast Dormancy Best Practices," V1.0, 21 pages, May 26, 2010.
Haas, Zygmunt J. et al., "Mobile-TCP: An Asymmetric Transport Protocol Design for Mobile Systems," IEEE, pp. 1054-1058, 1997.
Haas, Zygmunt J. et al., "The Design and Performance of Mobile TCP for Wireless Networks," Journal of High Speed Networks, vol. 10, pp. 187-207, 2001.
Hajdu, Kalman et al., "Lotus Notes Release 4 in a Multiplatform Environment," IBM Corporation, 173 pages, Feb. 1996.
Hardy, Ed, "Microsoft Proposes Two New Thumb-Driven User Interfaces," Brighthand Consulting, Inc., 2 pages, 2003.
IBM Corporation, "The Architecture of Lotus Notes," White Paper No. 114654, 26 pages, May 31, 1995.
IBM Corporation, "The History of Notes and Domino," Lotus Developer Domain, 11 pages, Sep. 29, 2003.
ImTOO, "ImTOO iPod Movie Converter," 3 pages, Nov. 9, 2005.
IntelliLink Corporation, "IntelliLink® for Windows User's Guide," Version 3.0, 167 pages, 1994.
International Application No. PCT/US2003/000618, International Search Report, 1 page, Apr. 4, 2003.
International Application No. PCT/US2003/000624, International Search Report, 2 pages, May 13, 2003.
International Application No. PCT/US2005/037702, International Preliminary Examination Report, 6 pages, Nov. 20, 2007.
International Application No. PCT/US2005/037702, International Search Report, 1 page, Nov. 5, 2007.
International Application No. PCT/US2005/037702, Written Opinion, 6 pages, Nov. 5, 2007.
International Application No. PCT/US2005/038135, International Search Report, 2 pages, Aug. 8, 2008.
International Application No. PCT/US2005/038135, Written Opinion, 8 pages, Aug. 8, 2008.
International Application No. PCT/US2005/038135, International Preliminary Report on Patentability, 9 pages, Oct. 31, 2011.
International Application No. PCT/FI2005/050424, International Search Report, 4 pages, Mar. 2, 2006.
International Application No. PCT/FI2005/050426, International Search Report, 3 pages, Mar. 1, 2006.
International Application No. PCT/FI2005/050441, International Search Report, 3 pages, Mar. 1, 2006.
International Application No. PCT/US2006/023426, International Search Report, 1 page, Feb. 21, 2007.
International Application No. PCT/US2006/023427, International Search Report, 1 page, Oct. 12, 2006.
International Application No. PCT/US2007/014462, International Search Report, 1 page, Jul. 2, 2008.
International Application No. PCT/US2007/014497, International Search Report, 1 page, Aug. 25, 2008.
Japanese Patent Application No. 2003-558726, Office Action, 2 pages, Jun. 10, 2008.
Karlson, Amy K. et al., "AppLens and LaunchTile: Two Designs for One-Handed Thumb Use on Small Devices," Proceedings of CHI 2005, 10 pages, Apr. 2-7, 2005.
Kent, S. et al., "Security Architecture for the Internet Protocol," RFC 2401, The Internet Society, 62 pages, Nov. 1998.
Kleinberg, Jon, "The Small-World Phenomenon: An Algorithmic Perspective," Cornell Computer Science Technical Report 99/1776, 14 pages, Oct. 1999.
Koeppel, Dan, "GUIs Just Want to Have Fun," Wired Magazine, Issue 8.10, 12 pages, Oct. 2000.
Kornblith, Polly Russell, "Lotus Notes Answers: Certified Tech Support," Covers Release 3, McGraw-Hill, Inc., 326 pages, 1994.
Kreisle, Bill, "Teach Yourself . . . Lotus Notes 4," MIS Press, 464 pages, 1996.
Lamb, John P. et al., "Lotus Notes Network Design," McGraw-Hill, 278 pages, 1996.
Londergan, Stephen et al., "Lotus Notes® Release 4 for Dummies®," IDG Books Worldwide, 229 pages, 1996.
Lotus Development Corporation, "Firewall Security Overview and How Firewalls Relate to Lotus Notes," Lotus Notes Knowledge Base, 9 pages, May 22, 1996.
Lotus Development Corporation, "How to Set Up 'Firewall' Protection for a Notes Domain," Lotus Notes Knowledge Base, 2 pages, Nov. 6, 1995.
Lotus Development Corporation, "Lotus Announces Lotus NotesPump 1.0," Lotus Notes Knowledge Base, 6 pages, Oct. 31, 1995.
Lotus Development Corporation, "Lotus Inside Notes—The Architecture of Notes and the Domino Server," 207 pages, 2000.
Lotus Development Corporation, "Lotus NotesPump 1.0 Q & A," Lotus Notes Knowledge Base, 3 pages, Oct. 31, 1995.
Lotus Development Corporation, "Lotus NotesPump: Database Integration for Lotus Notes," Lotus Notes Knowledge Base, 5 pages, Oct. 31, 1995.
Lotus Development Corporation, "Lotus Notes Administration," Release 3.3, 20 pages, 1995.
Lotus Development Corporation, "Lotus Notes Administrators Guide," Release 4, 499 pages, 1995.
Lotus Development Corporation, "Lotus Notes Administrators Guide—Server for NetWare, OS-2, and Unix," Release 3.1, 509 pages, 1994.
Lotus Development Corporation, "Lotus Notes Administrators Guide—Server for Windows," Release 3.1, 345 pages, 1994.
Lotus Development Corporation, "Lotus Notes Application Developer's Guide," Release 4, 475 pages, 1995.
Lotus Development Corporation, "Lotus Notes Customer Service Application Guide," Release 3.1, 46 pages, 1994.
Lotus Development Corporation, "Lotus Notes Customer Support Guide," 33 pages, Published prior to Jan. 8, 2003.
Lotus Development Corporation, "Lotus Notes Customer Support Guide—North American Guide," Release 4.1, 51 pages, Published prior to Jan. 8, 2003.
Lotus Development Corporation, "Lotus Notes Database Manager's Guide," Release 4, 115 pages, 1995.
Lotus Development Corporation, "Lotus Notes Deployment Guide," Release 4, 104 pages, 1995.
Lotus Development Corporation, "Lotus Notes for Windows, OS-2, and Macintosh," Release 3.3, 89 pages, 1995.

Lotus Development Corporation, "Lotus Notes Getting Started With Application Development," Release 3.1, 151 pages, 1994.
Lotus Development Corporation, "Lotus Notes Install Guide for Servers," Release 4, 68 pages, 1996.
Lotus Development Corporation, "Lotus Notes Install Guide for Workstations," Release 4, 28 pages, 1995.
Lotus Development Corporation, "Lotus Notes Install Guide for Workstations," Release 4.1, 67 pages, 1996.
Lotus Development Corporation, "Lotus Notes Install Guide for Workstations," Release 4.5, 81 pages, 1996.
Lotus Development Corporation, "Lotus Notes Internet Cookbook for Notes Release 3," 21 pages, Jan. 16, 1996.
Lotus Development Corporation, "Lotus Notes Internet Cookbook for Notes Release 4," 35 pages, Feb. 14, 1996.
Lotus Development Corporation, "Lotus Notes Internotes Web Navigator Administrator's Guide," Release 4, 60 pages, 1995.
Lotus Development Corporation, "Lotus Notes Internotes Web Navigator Users Guide," Release 4, 56 pages, 1995.
Lotus Development Corporation, "Lotus Notes Internotes Web Publisher Guide," Release 4, 122 pages, 1996.
Lotus Development Corporation, "Lotus Notes LotusScript Classes for Notes," Release 4, 6 pages, Published prior to Jan. 8, 2003.
Lotus Development Corporation, "Lotus Notes Migration Guide," Release 4, 110 pages, 1996.
Lotus Development Corporation, "Lotus Notes Network Configuration Guide," Release 4.5, 121 pages, 1996.
Lotus Development Corporation, "Lotus Notes Network Driver Documentation," Release 3.1, 100 pages, 1994.
Lotus Development Corporation, "Lotus Notes Programmer's Guide—Part 1," Release 4, 614 pages, 1995.
Lotus Development Corporation, "Lotus Notes Programmer's Guide—Part 2," Release 4, 462 pages, 1995.
Lotus Development Corporation, "Lotus Notes Quick Reference for Application Developers," Release 3, 6 pages, Published prior to Jan. 8, 2003.
Lotus Development Corporation, "Lotus Notes Quick Reference for Macintosh," Release 3, 6 pages, Published prior to Jan. 8, 2003.
Lotus Development Corporation, "Lotus Notes Quick Reference for SmartIcons," Release 3.1, 4 pages, Published prior to Jan. 8, 2003.
Lotus Development Corporation, "Lotus Notes Quick Reference for Windows and Presentation Manager," Release 3, 6 pages, Published prior to Jan. 8, 2003.
Lotus Development Corporation, "Lotus Notes Release Notes," Release 4, 139 pages, 1995.
Lotus Development Corporation, "Lotus Notes Release Notes," Release 4.1, 197 pages, 1996.
Lotus Development Corporation, "Lotus Notes Server for Windows," Release 3.3, 7 pages, 1994.
Lotus Development Corporation, "Lotus Notes Server Up and Running!," Release 4, 13 pages, 1996.
Lotus Development Corporation, "Lotus Notes Site and Systems Planning Guide," Release 3.1, 169 pages, 1994.
Lotus Development Corporation, "Lotus Notes Start Here—Workstation Install for Windows, OS-2 and Macintosh," Release 3.3, 47 pages, 1995.
Lotus Development Corporation, "Lotus Notes Step by Step—A Beginner's Guide to Lotus Notes," Release 4, 179 pages, 1995.
Lotus Development Corporation, "Lotus Notes Step by Step—A Beginner's Guide to Lotus Notes," Release 4.1, 167 pages, 1996.
Lotus Development Corporation, "Lotus Software Agreement," 8 pages, Published prior to Jan. 8, 2003.
Lotus Development Corporation, "What Is the Notes Replicator?," Lotus Notes Knowledge Base, 8 pages, Jul. 5, 1995.
"Lotus Notes Advisor," Advisor Publications Inc., 55 pages, Jun. 1995.
"Lotus Notes Advisor," Advisor Publications Inc., 55 pages, Aug. 1995.
"Lotus Notes Advisor," Advisor Publications Inc., 55 pages, Oct. 1995.
"Lotus Notes Advisor," Advisor Publications Inc., 55 pages, Dec. 1995.
"Lotus Notes Advisor," Advisor Publications Inc., 63 pages, Jan.-Feb. 1996.
"Lotus Notes Advisor," Advisor Publications Inc., 55 pages, Apr. 1996.
"Lotus Notes Advisor," Advisor Publications Inc., 55 pages, Jun. 1996.
"Lotus Notes Advisor," Advisor Publications Inc., 55 pages, Aug. 1996.
"Lotus Notes Advisor," Advisor Publications Inc., 55 pages, Oct. 1996.
"Lotus Notes Advisor," Advisor Publications Inc., 63 pages, Dec. 1996.
"Lotus Notes—Notes Administration Help," Screen Shots, 17 pages, Published prior to Jan. 8, 2003.
MacGregor, Rob et al., "The Domino Defense: Security in Lotus Notes and the Internet," IBM Corporation, 183 pages, Dec. 1997.
Maltz, David A. et al., "MSOCKS: An Architecture for Transport Layer Mobility," IEEE, pp. 1037-1045, 1998.
Marmel, Elaine, "Easy Lotus® Notes Release 4.0," Que Corporation, 237 pages, 1996.
Mason, Luke, "Windows XP: New GUI Design Shows Skin Is in," TechRepublic, 4 pages, Apr. 4, 2001.
McMullen, Melanie, "Network Remote Access and Mobile Computing," Miller Freeman Inc., 226 pages, 1994.
Microsoft, Definition of "Access," Microsoft Computer Dictionary, Fifth Edition, 2 pages, May 1, 2002.
Microsoft, Definition of "Synchronization," Microsoft Computer Dictionary, Fifth Edition, 2 pages, May 1, 2002.
Milgram, Stanley, "The Small-World Problem," Psychology Today, vol. 2, pp. 60-67, 1967.
Miller, Victor S., "Use of Elliptic Curves in Cryptography," Advances in Cryptology—CRYPTO '85 Proceedings, vol. 218, pp. 417-426, 1985.
Myers, Brad A. et al., "Extending the Windows Desktop Interface With Connected Handheld Computers," WSS'00 Proceedings of the 4th Conference on USENIX Windows Systems Symposium, vol. 4, 10 pages, 2000.
Myers, Brad A. et al., "User Interfaces That Span Hand-Held and Fixed Devices," CHI'2001 Workshop on Distributed and Disappearing User Interfaces in Ubiquitous Computer, 4 pages, 2001.
National Institute of Standards and Technology, "Advanced Encryption Standard (AES)," Federal Information Processing Standards Publication 197, 52 pages, Nov. 26, 2001.
National Institute of Standards and Technology, "Secure Hash Standard," Federal Information Processing Standards Publication 180-2, 83 pages, Aug. 1, 2002.
Netscape Communications Corporation, "Netscape Mail Server Administrators Guide," Version 2.0, 172 pages, 1996.
Netscape Communications Corporation, "Netscape Mail Server Installation Guide," Version 2.0 for Unix, 62 pages, 1996.
Netscape Communications Corporation, "Netscape Mail Server User's Guide," Version 2.0, 35 pages, 1996.
Netscape Communications Corporation, "Netscape News Server Administrator's Guide for Windows NT," Version 2.0, 119 pages, 1996.
Niederée, Claudia et al., "A Multi-Dimensional, Unified User Model for Cross-System Personalization," Proceedings of the AVI 2004 Workshop on Environments for Personalized Information Access, 11 pages, 2004.
Nokia, "Developer Platforms," 3 pages, 2005.
"NotesPump 1.0 Release Notes," Publication Unknown, 8 pages, Published prior to Jan. 8, 2003.
Opyt, Barbara et al., "Use the Internet As Your Lotus Notes WAN," Lotus Notes Advisor, pp. 17-20, Nov.-Dec. 1996.
Ortiz, C. Enrique, "An Introduction to the Symbian OS™ Platform for Palm OS® Developers," Metrowerks Corp., 21 pages, 2002.
"Overview—What Is Lotus NotesPump?," Publication Unknown, 88 pages, Published prior to Jan. 8, 2003.
Phillips, Joshua et al., "Modeling the Intelligence Analysis Process for Intelligent User Agent Development," Research and Practice in Human Resource Management, vol. 9, No. 1, pp. 59-73, 2001.
Pyle, Hugh, "The Architecture of Lotus Notes," Lotus Notes Advisor, Premiere Issue, pp. 18-27, 1995.
Pyle, Lisa, "A Jump Start to the Top Ten R3-To-R4 Migration Considerations," The View, vol. 1, Issue 5, 22 pages, Nov.-Dec. 1995.

Qualcomm, "System Parameter Recommendations to Optimize PS Data User Experience and UE Battery Life," 80-W1112-1, Revision B, 9 pages, Mar. 2007.

Ringel, Meredith et al., "iStuff: A Scalable Architecture for Lightweight, Wireless Devices for Ubicomp User Interfaces," Proceedings of UbiComp 2002, 2 pages, 2002.

Shafran, Andrew Bryce, "Easy Lotus Notes® for Windows™," Que Corporation, 199 pages, 1994.

Signorini, Eugene, "Seven's Service-Based Wireless Solutions Enable Enterprises to Untether E-Mail," Wireless/Mobile Enterprise & Commerce, 16 pages, Oct. 2004.

Swedeen, Bret et al., "Under the Microscope—Domino Replication," LDD Today, 8 pages, Oct. 1, 1998.

Tamura, Randall A., "Lotus® Notes™ 4 Unleashed," Sams Publishing, 928 pages, 1996.

U.S. Appl. No. 60/663,463, File History, 113 pages, Mar. 18, 2005.

Vivacqua, Adriana et al., "Profiling and Matchmaking Strategies in Support of Opportunistic Collaboration," CoopIS/DOA/ODBASE 2003, LNCS 2888, pp. 162-177, 2003.

Wainwright, Andrew, "Secrets to Running Lotus Notes: The Decisions No One Tells You How to Make," IBM Corporation, 193 pages, Oct. 1996.

Wilcox, Adam A., "PC Learning Labs Teaches Lotus Notes 3.0," Ziff-Davis Press, 381 pages, 1993.

Wong, Harry, "Casahl's Replic-Action: Delivering True Notes-DBMS Integration," The View, vol. 2, Issue 1, pp. 33-50, Jan.-Feb. 1996.

\* cited by examiner

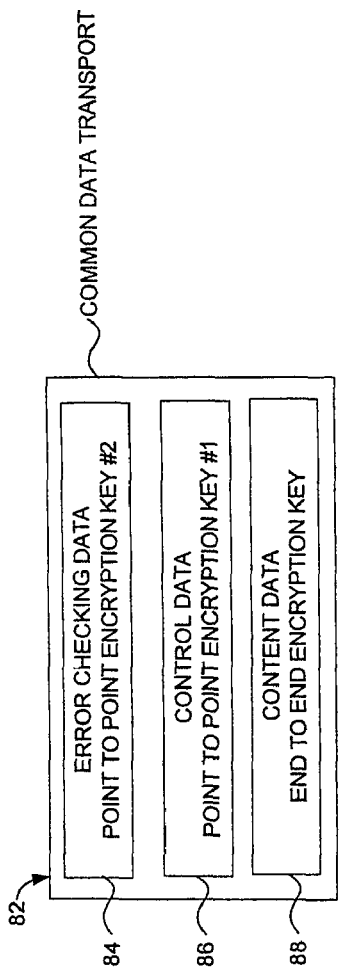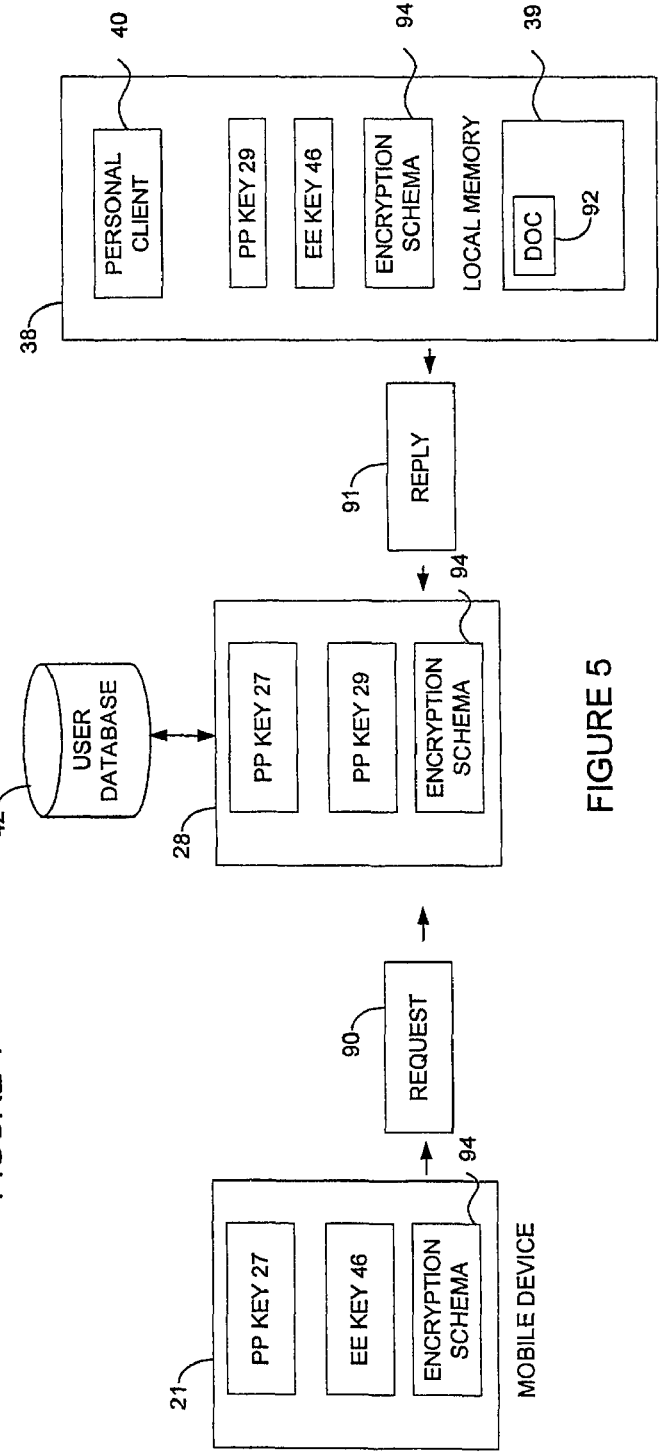

SOURCE

TRANSFER AGENT

SECURE END-TO-END TRANSPORT THROUGH INTERMEDIARY NODES

CROSS-REFERENCES TO RELATED APPLICATIONS

This application is a continuation of U.S. patent application Ser. No. 11/875,785, filed Oct. 19, 2007 now U.S. Pat. No. 7,827,597, titled "SECURE TRANSPORT FOR MOBILE COMMUNICATION NETWORK", which application is a continuation of U.S. patent application Ser. No. 10/339,369, filed Jan. 8, 2003 now U.S. Pat. No. 7,305,700, titled "SECURE TRANSPORT FOR MOBILE COMMUNICATION NETWORK", which application claims the benefit of U.S. Provisional Application No. 60/346,881, filed Jan. 8, 2002, titled "METHOD AND SYSTEM FOR MOBILE DATA COMMUNICATIONS," and claims the benefit of U.S. Provisional Application No. 60/403,249, filed Aug. 12, 2002, titled "MOBILE DATA SERVICES" the contents of which are hereby incorporated in their entirety by reference.

BACKGROUND

Security is a concern when information is transferred over the Internet. Encryption technology may be used to protect data transferred between two nodes communicating across a network such as the Internet. The Internet infrastructure involved in transferring a particular set of data may include one or more intermediary network processing nodes that need to process different portions of the data in order to correctly route the packets between the two endpoints.

The intermediary network processing nodes may be given access to the encryption key used to encrypt the data. However, decrypting the packets at the intermediary points presents a security risk. For example, an eavesdropper may be able to access the data after being decrypted at the intermediary network processing nodes.

The present invention addresses this and other problems associated with the prior art.

SUMMARY OF THE INVENTION

A communication node encrypts a first portion of a transaction associated with point-to-point communications using a point-to-point encryption key corresponding to a first security association. A second portion of the transaction associated with end-to-end communications is encrypted using an end-to-end encryption key corresponding to a second security association.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 4 is a diagram showing how different types of data are encrypted using different encryption keys.

FIG. 5 is a diagram showing an encryption schema used for encrypting transactions.

DETAILED DESCRIPTION

The transfer of different types of data may be referred to below generally as a transaction. These transactions can be used for transferring email data, calendars, contacts, tasks, notes, electronic documents, files or any other type of control or content data.

Figure 1:
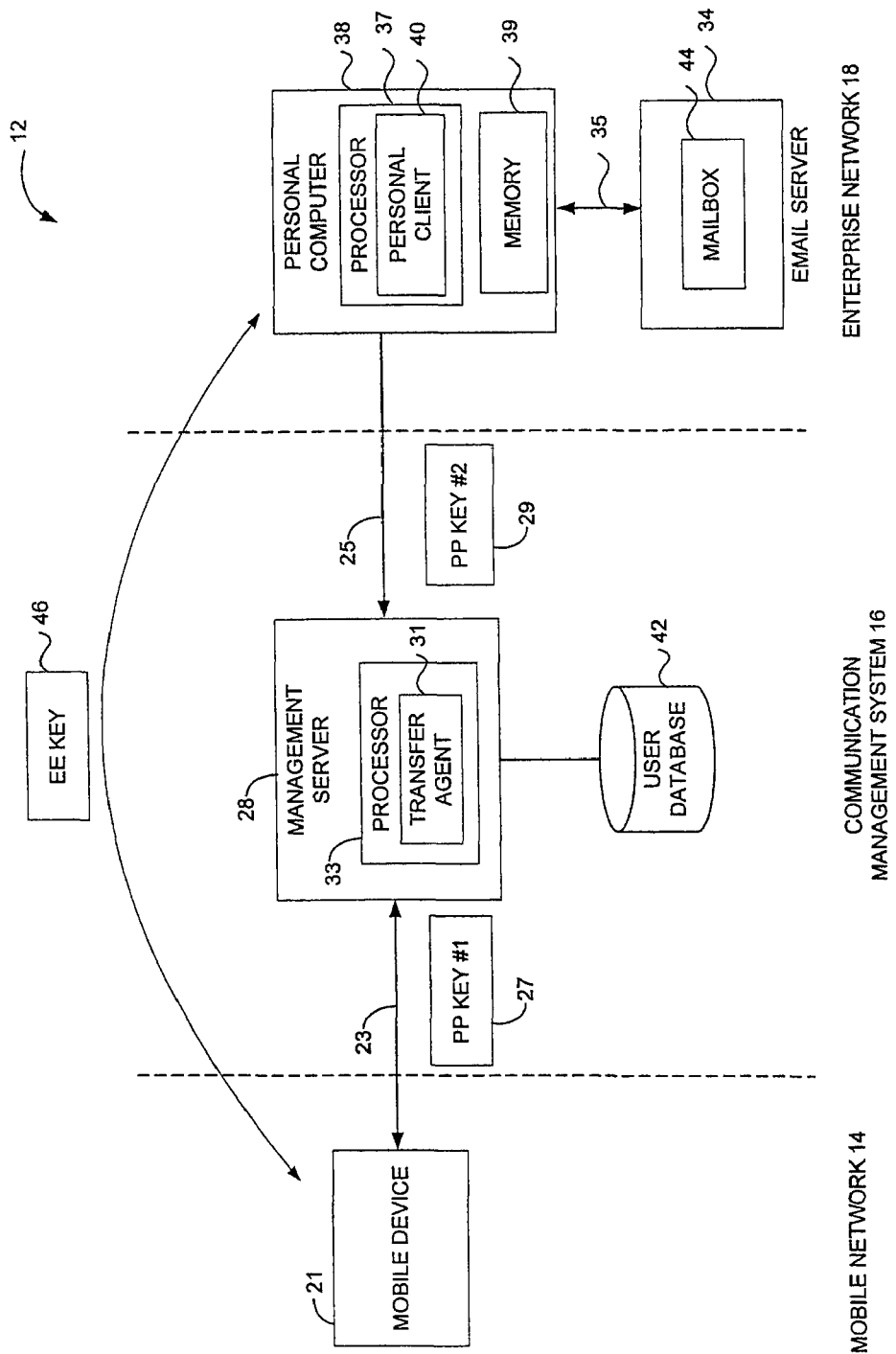
FIG. 1 is a block diagram showing how encryption keys are exchanged in a communication network.

FIG. 1 shows one embodiment of a communication network 12 that includes a mobile network 14, an enterprise network 18, and a communication management system 16 that manages communications between the mobile network 14 and the enterprise network 14. The mobile network 14 includes mobile devices 21 that communicate with an IP infrastructure through a wireless or landline service provider. Since mobile networks 14 are well known, they are not described in further detail.

The enterprise network 18 can be any business network, individual user network, or local computer system that maintains local email or other data for one or more users. In the embodiment shown in FIG. 1, the enterprise network 18 includes an email server 34 that contains a user mailbox 44 accessible using a Personal Computer (PC) 38. In one example, the email server 34 may be a Microsoft® Exchange® server and the PC 38 may access the mailbox 44 through a Microsoft® Outlook® software application. The mailbox 44 may contain emails, contact lists, calendars, tasks, notes, or any other type of data or electronic document.

The PC 38 is connected to the email server 34 over a Local Area Network (LAN) 35. The PC 38 includes memory 39 for storing local files that may include personal email data as well as any other types of electronic documents. Personal client software 40 is executed by a processor 37 in the PC 38. The personal client 40 enables access to email, calendars, and contact information as well as local files for mobile device 21.

The communication management system 16 includes at least one management server 28 that includes a processor 33. The processor operates a transfer agent 31 that manages the transactions between the mobile device 21 and the enterprise network 18. A user database 42 includes configuration information for different users of a mobile communication server. For example, the user database 42 may include login data for user of the mobile communication server. While referred to as a management system 16 and management server 28, this can be any intermediary system that includes one or more intermediary servers that operate between the mobile network 14 and the enterprise or private network 18.

The personal client 40 makes an outbound connection 25 to the management server 28. The personal client 40 registers the presence of a particular user to the management server 28 and negotiates a security association specifying a cryptographic ciphersuite (including encryption cipher, key length, and digital signature algorithm) and a unique, secret point-to-point encryption key 29 over connection 25. In one example, the key 29 is an Advanced Encryption Standard (AES) key, which is negotiated using the Diffie-Hellman cryptographic algorithm. Of course, encryption ciphers other than AES can also be used. The encryption key 29 enables secure communication between management server 28 and PC 38 over connection 25.

The mobile device 21 negotiates a point-to-point security association, specifying a cryptographic ciphersuite and a unique encryption key 27, with the management server 28. In one example, the point-to-point encryption key 27 is an AES encryption key. The negotiated security association that includes encryption key 27 enables secure point-to-point communication between the mobile device 21 and the management server 28 over connection 23. Each different mobile device 21 must negotiate a different security association that includes a unique encryption key 27 with the management server 28.

The point-to-point encryption key 27 may be used for encrypting control data that needs to be transferred between the mobile device 21 and management server 28. The point-to-point encryption key 29 may be used for encrypting control data that needs to be transferred between the management server 28 and personal client 40. For example, the control data may include login information and transaction routing information.

An end-to-end security association, specifying a cryptographic ciphersuite and a unique encryption key 46, is negotiated between the mobile device 21 and the personal client 40. In one example, the end-to-end encryption key 46 is an AES encryption key. The end-to-end encryption key 46 is used for encrypting transaction payloads transferred between personal client 40 and mobile device 21. For example, the end-to-end encryption key 46 may be used for encrypting the content of emails, files, file path names, contacts, notes, calendars, electronic documents and any other type of data that needs to be securely transferred between mobile device and the PC. The end-to-end encryption key 46 is only known by the mobile device 21 and the personal client 40. Data encrypted using the end-to-end key 46 cannot be decrypted by the management server 28.

Figure 2:
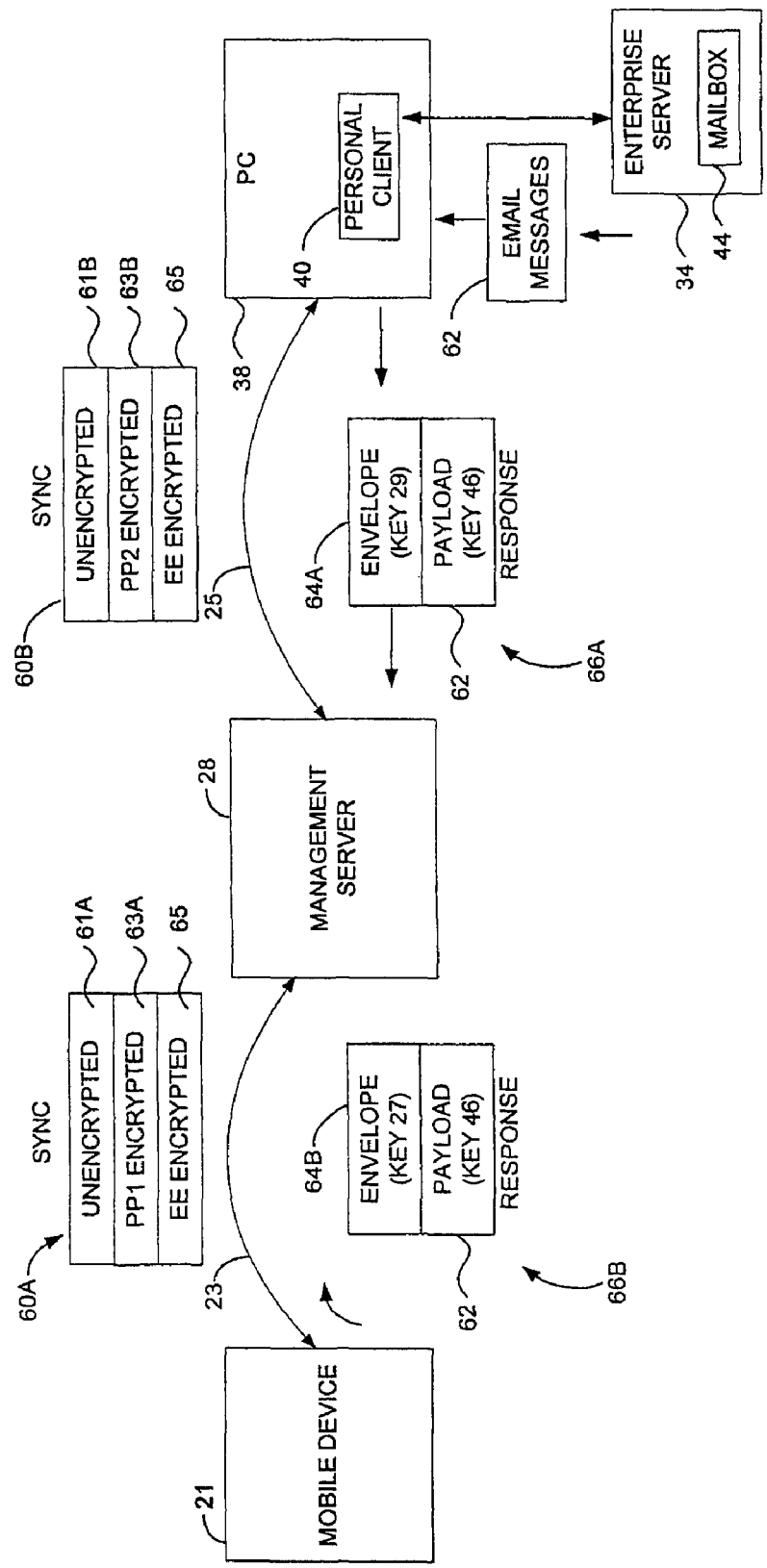
FIG. 2 is a block diagram showing how data is encrypted according to the encryption keys.

FIG. 2 shows an example of a synchronization transaction 60A sent by the mobile device 21 requesting retrieval of the latest email messages in mailbox 44. One portion 63A of the synchronization transaction 60A is encrypted by the mobile device 21 using the point-to-point encryption key 27 (FIG. 1). Another portion 65 of synchronization transaction 60A is encrypted using the end-to-end encryption key 46. Another third portion 61A of the synchronization transaction 60 may not be encrypted at all. The mobile device 21 sends the synchronization transaction 60A to the management server 28 over connection 23.

The management server 28 decrypts the portion 63A of the transaction 60 encrypted using the point-to-point encryption key 27. Since server 28 does not have encryption key 46, portion 65 is not decrypted. The management server 28 decodes any unencrypted data 61A and the decrypted point-to-point data 63A to determine how to process the synchronization transaction 60A. Part of the processing may include re-encrypting some or all of the decrypted data 63A back into point-to-point encrypted data 63B using encryption key 29. The management server 28 may also modify or add to the unencrypted data 61A to generate new unencrypted data 61B. The unencrypted data 61B and the re-encrypted point-to-point data 63B are combined with the end-to-end encrypted data 65 to generate new synchronization transaction 60B. The transaction 60B is transported to personal client 40 over the connection 25.

The personal client 40 decrypts the point-to-point encrypted data 63B using the encryption key 29 and decrypts the end-to-end encrypted data 65 using the encryption key 46. The personal client 40 obtains email messages 62 from the mailbox 44 pursuant to the decrypted instructions in synchronization transaction 60B. The personal client 40 encrypts the content of the email messages 62 using the end-to-end encryption key 46.

The personal client 40 generates a response transaction 66A that may attach an envelope 64A to the end-to-end encrypted email messages 62. The envelope 64A may contain communication parameters identifying transaction 66A as a response to the synchronization transaction 60B and may contain other message parameters such as the size of the email messages 62.

Some or all of the envelope 64A may be encrypted using the point-to-point encryption key 29. The personal client 40 then sends message 66A to the management server 28. The management server 28 decrypts the envelope 64A using the point-to-point encryption key 29 and processes the decrypted data necessary for forwarding the response transaction 66A to the mobile device 21. The payload 62 in the response transaction 66A is not decrypted since the management server 28 does not have access to end-to-end key 46.

The management server 28 re-encrypts some or all of the information in envelope 64A into envelope 64B. The envelope 64B is re-encrypted using the point-to-point key 27. A response message 66B is generated that includes the envelope 64B and end-to-end encrypted payload 62.

The response message 66B is transported to mobile device 21 over connection 23. The mobile device 21 decrypts the envelope 64B using encryption key 27 and decrypts the payload 62 using the encryption key 46. The decrypted payload 62 is then displayed on the mobile device 21. For example, emails from the mailbox 44 are displayed on the mobile device 21.

Figure 3:
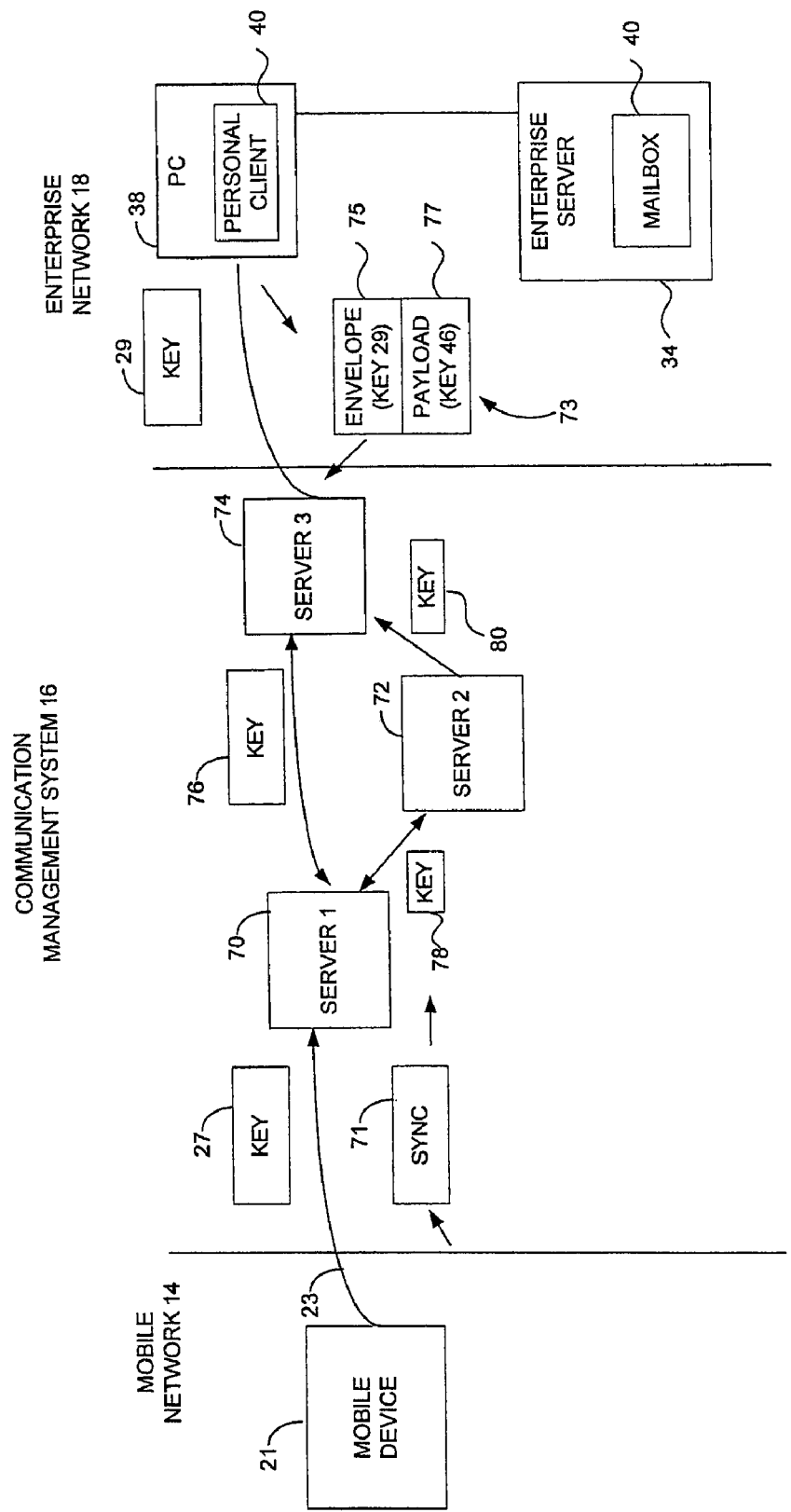
FIG. 3 is a block diagram showing how multiple encryption keys are exchanged between different servers in the communication network.

FIG. 3 shows another embodiment of the invention. The communication management system 16 may include multiple servers 70, 72 and 74 that each perform different communication management tasks. Transactions 71 and 73 sent between mobile device 21 and PC 38 may need to be processed by different combinations of servers 70, 72 and 74.

Encryption key 76 is negotiated between server 70 and server 74, encryption key 78 is negotiated between server 70 and server 72, and encryption key 80 is negotiated between server 72 and server 74. The negotiated encryption keys 76, 78 and 80 are used when processing the transactions 71 and 73.

For example, the transaction 73 may be sent from personal client 40 to server 74. The personal client 40 encrypts some or all of the envelope 75 in transaction 73 using the encryption key 29 and encrypts a payload 77 using encryption key 46. After receiving transaction 73, server 74 decrypts envelope 75 using encryption key 29.

Server 74 may then need to send the transaction 73 to server 70. Server 74 re-encrypts the decrypted envelope 75 using encryption key 76. Upon receiving message 73, server 70 decrypts envelope 75 using encryption key 76. After processing the contents, the server 70 re-encrypts the envelope 75 using the encryption key 27 previously negotiated with mobile device 21. The transaction 73 is then sent from server 70 to mobile device 21. Similar to FIG. 2, the servers 70, 72 and 74 never have access to the encrypted payload 77 in transaction 73.

A synchronization transaction 71 on the other hand may need to be processed by all three servers 70, 72 and 74. A portion of the synchronization transaction 71 is encrypted using encryption key 27 when transported from mobile device 21 to server 70. Encryption key 78 is used for encrypting a portion of transaction 71 when transported from server 70 to server 72. Encryption key 80 is used to encrypt a portion of synchronization transaction 71 when transported from server 72 to server 74. Encryption key 29 is then used when the transaction 71 is transported from server 74 to PC 38.

Algorithms exist that allow secure negotiation of encryption keys between two nodes that are communicating directly with each other or that are communicating through intermediary nodes. One example of an encryption algorithm that allows secure key negotiation regardless of network topology is Elliptic Curve Cryptography Diffie-Hellman (ECC-DH).

FIG. 4 shows how encryption is performed differently for different types of data or for data associated with different destinations. Transaction 82 includes content data 88 such as the contents of an email message, an electronic document, or any other type of information that should only be accessed by two endpoints. The content data 88 is encrypted using an end-to-end encryption key.

A second portion 86 of transaction message 82 may include control information that only needs to be processed by one particular server. In this case, control data 86 is encrypted using a first point-to-point encryption key. A third portion of data 84 in transaction 82 may have other control information, for example, error checking data, that needs to be processed by a different server. Accordingly, the error checking data 84 is encrypted using a second point-to-point encryption key different than either of the other two encryption keys used for encrypting data 88 and 86.

FIG. 5 explains in more detail how an encryption scheme is used by the mobile device 21, management server 28, and personal client 40 when processing transactions between a source and a target device. In the example below, the mobile device 21 is operating as a source for sending a transaction 90. The transaction 90 requests personal client 40 to send a document 92 located in a personal directory in local memory 39 of PC 38. The personal client 40 operates as a target for the transaction 90 and the management server 28 operates as the transfer agent for transferring the transaction 90 from the mobile device 21 to the personal client 40.

It should be understood that this is only an example, and the devices shown in FIG. 5 can process many different types of transactions. For example, the transaction 90 may request synchronization of emails in the PC 38 with emails in the mobile device 21. Further, any device can operate as a source or target for the transaction. For example, the personal client 40 operates as a source and the mobile device 21 operates as a target when a transaction 91 is sent as a reply to request 90.

The mobile device 21, management server 28, and the personal client 40 are all configured with an encryption schema 94 that identifies how specific items in the transaction 90 are to be encrypted. Each device is also configured with different security associations as described above in FIGS. 1-3. For example, the mobile device 21 has both Point-to-Point (PP) key 27 and End-to-End (EE) key 46. Management server 28 has PP key 27 and PP key 29, and the PC 38 has PP key 29 and EE key 46.

Figure 6:
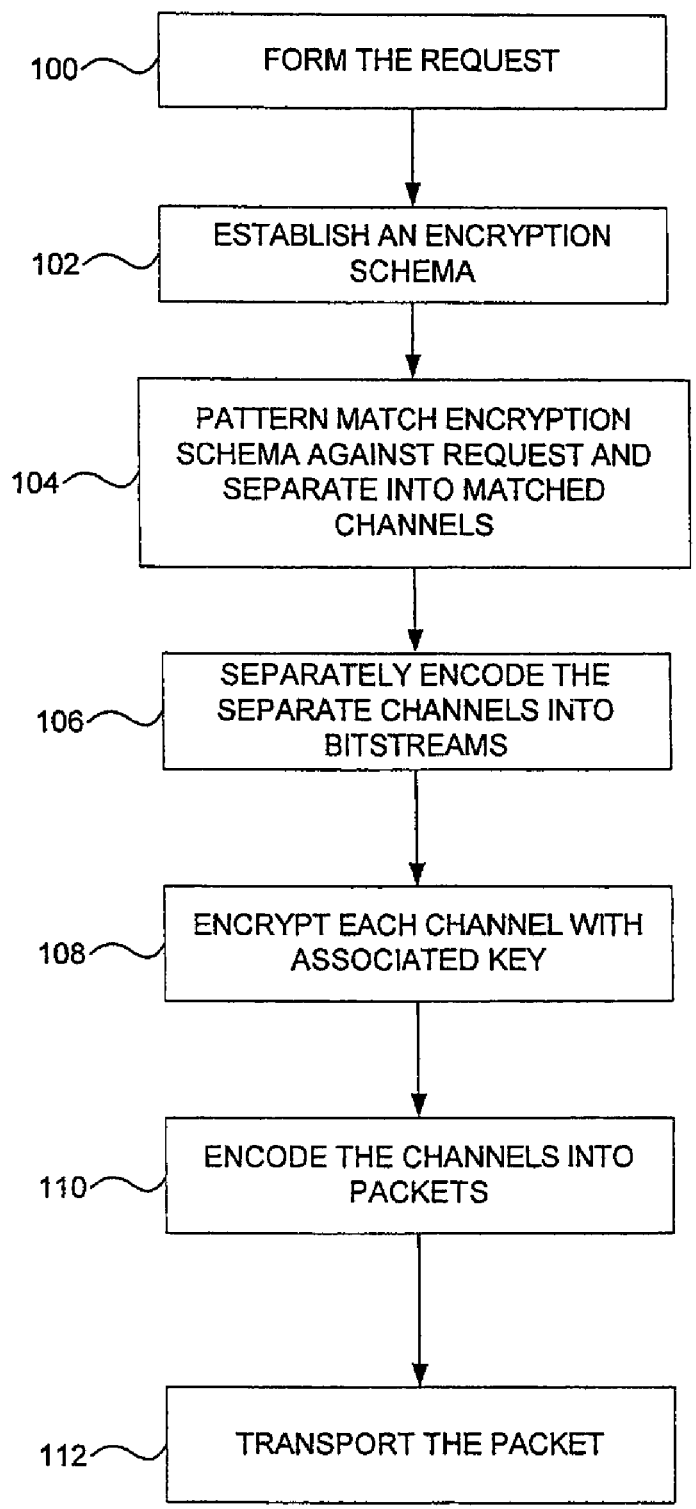
FIGS. 6-8 are block diagrams showing how different devices in the communication network use the encryption schema to encrypt and decrypt transactions.

Referring to FIGS. 5 and 6, the mobile device 21 in block 100 forms the request transaction 90. One example of a request is as follows.

```
Request:     {auth_token = "abc",
              device_id = "xyz",
              method_id = "GetDocument",
              args = {path = "/docs"}
             }
```

Mobile device 21 attaches an auth_token to transactions sent to the management server 28. For example, the mobile device 21 may be required to authenticate to the management server 28 by transmitting a username and password prior to being permitted to submit other transactions for processing. The server 28 issues the mobile device 21 an auth_token after successfully validating the username and password against information in the user database 42. The mobile device 21 then attaches the auth_token to subsequent transactions sent to the management server 28. The management server 28 uses the auth_token to identify and authenticate the source of each transaction and to determine where to route the transaction.

The device_id identifies the particular mobile device 21 sending the request 90. The device_id may be necessary for example when a user has more than one mobile device. The personal client 40 can use different device_id values to track when synchronization information was last sent to each of multiple different mobile devices. The device_id can also be used by either the management server 28 or the personal client 40 to determine how to format data sent to particular types of mobile devices 21. For example, data may need to be formatted differently for a cell phone as opposed to a personal computer. The device_id can also be used to correlate a known security association with a particular mobile device.

The method_id item in the example identifies a particular function GetDocument associated with request 90. The method_id item also requires the inclusion of related argument items that identify the parameters for the GetDocument function. For example, the argument items might include the expression path="/docs" identifying the pathname where the requested documents are located.

Block 102 in FIG. 6 establishes the encryption schema 94 previously shown in FIG. 5. One example of an encryption schema 94 is shown below illustrating how the example GetDocument request shown above would be handled in the specific case of communication between the mobile device 21 and the management server 28.

```
Encryption schema:   {GetDocument =
                       {clear = ["device_id"],
                        pp = ["auth_token", "user_id"],
                        ee = ["args.path"]
                       }
                       default = { pp }
                      }
```

Any items that do not require encryption are assigned to the data channel labeled "clear". For example, the device_id item in the example is assigned to the channel "clear". Items requiring the use of point-to-point encryption are assigned to data channel "pp" and therefore are encrypted using the PP key 27 as shown in FIG. 5. In this example the auth_token is assigned to the "pp" channel and encrypted using the PP key 27. Items requiring end-to-end encryption are assigned to the "ee" channel and encrypted using the EE key 46 shown in FIG. 5. In this example the "args.path" item is assigned to the "ee" channel and encrypted using the EE key 46.

In this example, any item that is not explicitly declared in the encryption schema 94 is assigned by default to the "pp" channel. Since the method_id item has not been specifically declared in the encryption schema 94, it is assigned to the "pp" channel by default and encrypted using the PP key 27.

It is important to note that the context of the communication determines the specific security association selected for encryption of a channel. For example, the first "pp" channel between mobile device 21 and management server 28 uses a security association different from the one established for the second, independently established "pp" channel between management server 28 and personal client 40. In this example, the first "pp" channel would employ the PP key 27 in FIG. 5 for transactions between device and server, while the second "pp" channel would use the PP key 29 for transactions between server and client. Because each security association is independently negotiated, the differences between the two aforementioned "pp" channels could extend beyond each channel having a unique key to include different key lengths (i.e. 256 bit vs. 128 bit), encryption ciphers (i.e. Triple DES vs. AES), digital signature algorithm (i.e. SHA1 vs. MD5), or other security parameters.

In order to prepare the request 90 for transmission, the mobile device 21 in block 104 of FIG. 6 performs a pattern match of the request 90 using the encryption schema 94. This pattern match separates the items in request 90 into different channels. One example of the different channels is shown below. In this example, the items in each channel are associated with predefined security associations: clear, pp, and ee.

```
Channels:
         {clear = { device_id = "xyz"}
         pp = {auth_token = "abc", method_id = "GetDocument"}
         ee = {args = {path = {path = "/docs"}}}
         }
```

In block 106, the channel contents are encoded (via a process commonly known as serialization) into arrays of bits or bytes referred to as data groups. These groupings of bits or bytes are referred to generally below as arrays but can be any type of partition, group, etc.

The contents of the clear channel are encoded into an array of bits referred to as data_group_1, the contents of the pp channel are encoded into an array of bits referred to as data_group_2, and the contents of the ee channel are encoded into an array of bits referred to as data_group_3. The contents of each channel need to be encoded into bit arrays so that they can be encrypted. The contents of the channels after being encoded into bit arrays are represented as follows.

```
Encoded
Channels:    {clear = data_group_1
              pp = data_group_2
              ee = data_group_3}
```

The bit arrays are then encrypted in block 108 according, to, the security association parameters for each channel. According to the encryption schema 94, bits in the clear channel (data_group_1) are not encrypted. The bits in the pp channel data_group_2 are encrypted using the point-to-point security association between mobile device 21 and management server 28, using PP key 27, and are referred to after encryption as pp_data_group_2. The bits in the ee channel data_group_3 are encrypted using the end-to-end security association between mobile device 21 and personal client 40, using EE key 46, and are referred to after encryption as ee_data_group_3. The data groups are represented as follows after encryption:

```
Encrypted
Channels:    {clear = data_group_1
              pp = pp_data_group_2
              ee = ee_data_group_3}
```

The bits making up the encrypted and unencrypted channels are then encoded into one or more packets in block 110. For clarity, the description below will refer to a single packet, however, the data from the channels may be contained in multiple packets. Some of the contents of the packet are shown below.

| Packet | |
|---|---|
| Header | length |
|  | version |
|  | flags |
| Payload | count = 3 |
|  | "clear" |
|  | data_group_1 |
|  | "pp" |
|  | pp_data_group_2 |
|  | "ee" |
|  | ee_data_group_3 |

Information in the packet header may include the packet length, a version number, and other flags. The packet payload includes a count identifying 3 pairs of items. The three items include the non-encrypted contents in the clear channel, the pp encrypted contents of the pp channel, and the ee encrypted contents of the ee channel. The packet is then transported by mobile device 21 in block 112 to the management server 28.

Figure 7:
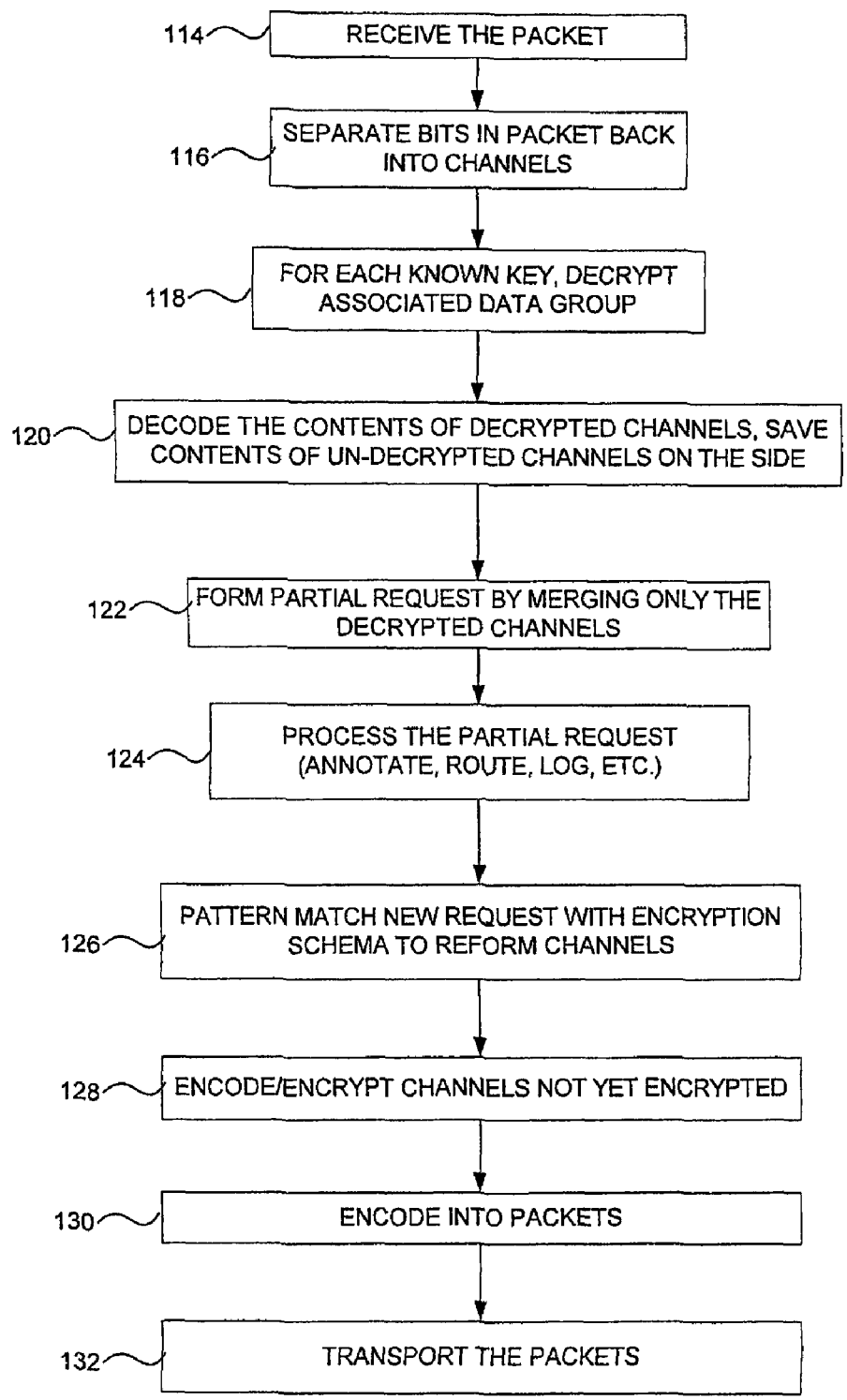

Referring to FIGS. 5 and 7, the transfer agent operating in server 28 receives the packet in block 114. The bits in the packet are separated in block 116 back into the different channels clear=data_group_1, pp=pp_data_group_2, and ee=ee_data_group_3.

The data in the clear channel does not need to be decrypted. The transfer agent in block 118 decrypts the only bits in channels for which it has a known security association. The transfer agent, as a member of the point-to-point security association between mobile device 21 and management server 28, possesses the PP key 27 and therefore decrypts the contents of the pp channel. The transfer agent is not a member of the end-to-end security association between mobile device 21 and personal client 40, does not have the EE key 46 and therefore does not decrypt the data in the ee channel. Decryption produces the following data groups: clear=data_group_1, pp=data_group_2, and ee=ee_data_group_3.

The transfer agent in block 120 decodes the contents of the clear and pp channels. The contents of the encrypted ee channel are not decoded, but instead are maintained in an unmodified state for eventual transport to the personal client 40. Decoding produces the following contents.

```
Decoded
Channels:    {clear = {device_id = "xyz"}
              pp = {auth_token = "abc", method_id = "GetDocument"}
              ee=ee_data_group_3
              }
```

In block 122 a partial request is formed by merging the items of the clear and pp channels. The partial request in this example could look similar to the following:

```
Partial Request:    {auth_token = "abc",
                    device_id = "xyz",
                    method_id = "GetDocument",
                    args = { }
                    encrypted = {ee=ee_data_group_3}
                    }
```

The transfer agent in block 124 processes the partial request. In this example, the transfer agent may verify the request is authorized by matching the value of auth_token ("abc") with contents in the user database 42 (FIG. 5). The auth_token and the method_id ("GetDocument") indicate that the transaction 90 is a document request directed to the personal client 40.

The transfer agent may identify a user_id="joe" associated with the auth_token="abc" and generate the following new request.

```
New Request:    {user_id = "joe",
                device_id = "xyz",
                method_id = "GetDocument",
                args = { }
                encrypted = {ee=ee_data_group_3}
                }
```

In block 126 the transfer agent performs another pattern match of the new request with the encryption schema 94 to reform the channel contents associated with the different security associations. In this example, the items in the clear, pp, and ee channels are fairly similar to the items originally sent by the mobile device 21. The reformed channel contents are shown below.

```
Channels Reformed
by Transfer Agent:
    {clear = { device_id = "xyz"}
    pp = {user_id = "joe", method_id = "GetDocument"}
    ee = ee_data_group_3
    }
```

The transfer agent in block 128 encodes the contents of the clear channel into a bit array (clear=data_group_1). Since the encryption schema 28 defines no encryption for the clear channel, the bit array data_group_1 is not encrypted. The contents of the pp channel are encoded into a bit array pp=data_group_2 and then encrypted using the point-to-point security association between the management server 28 and the personal client 40, using PP key 29, forming the encrypted bit array pp=pp_data_group. The contents of the ee channel have never been decrypted or decoded by the transfer agent and therefore do not need to be re-encoded or encrypted. The following represents the bit arrays for reformed transaction.

```
Encoded/encrypted
Channels:    {clear = data_group_1
             pp = pp_data_group_2
             ee = ee_data_group_3}
```

The transfer agent in block 130 encodes the channel contents into a packet format similar to that shown above. The packet is then transported to the personal agent 40 in block 132.

Figure 8:
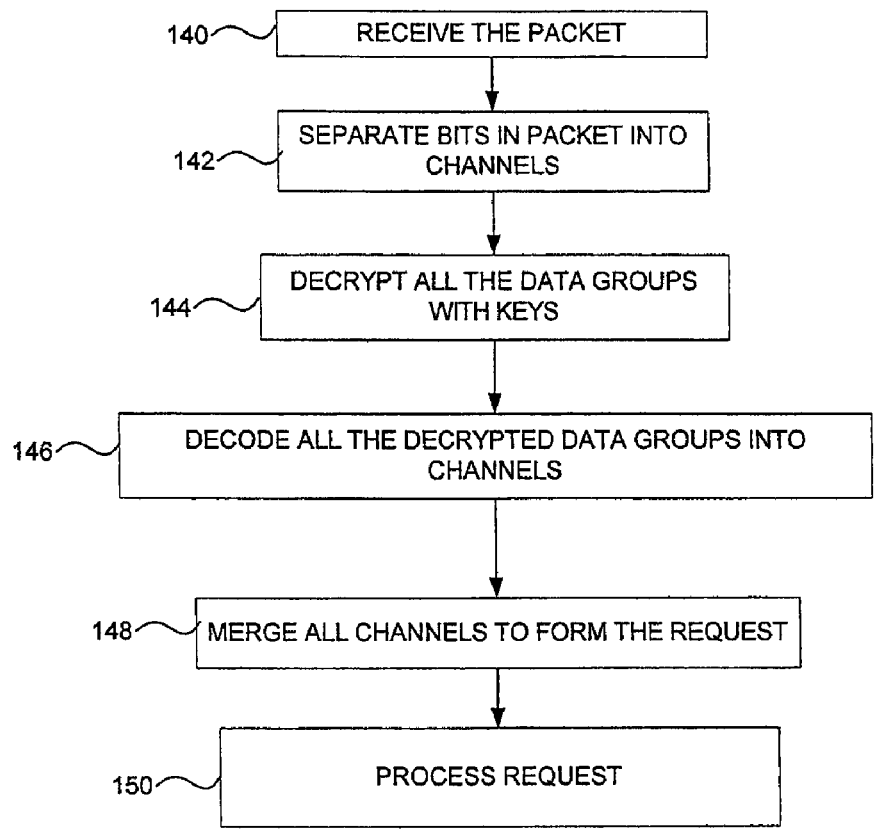

Referring to FIGS. 5 and 8, the personal client 40 is the target of the transaction 90. The personal client 40 receives the packet in block 140 and separates the bits in the packet back into channels in block 142.

```
Encoded/encrypted
Channels:    {clear = data_group_1
             pp = pp_data_group_2
             ee = ee_data_group_3}
```

The personal client 40 has the PP key 29, the EE key 46, and knowledge of the relevant security associations. Therefore the contents of both the pp channel and the ee channel are decrypted in block 144 generating the following decrypted bit arrays.

```
Decrypted
Channels:    {clear = data_group_1
             pp = data_group_2
             ee = data_group_3}
```

The contents of the channels are then decoded in block 146 generating the following request items.

```
Decoded
Channels:    {clear = { device_id = "xyz"}
             pp = {user_id = "joe",
             method_id = "GetDocument"}
             ee = {args = {path = "/docs"}
             }
```

The contents of the channels are then merged together in block 148 forming the reformed request 90 with the auth_token replaced with the user_id.

```
Request 90:    {device_id = "xyz",
               user_id = "joe",
               method_id = "GetDocument",
               args = {path = "/docs"}
               }
```

The personal client 40 processes the request 90 in block 150. Pursuant to the request 90, the personal client 40 retrieves the identified documents and then creates a reply transaction 91 (FIG. 5) in a manner similar to mobile device 21 formed request 90. For example, the retrieved documents are encrypted using the end-to-end security association between the personal client 40 and the mobile device 21, using EE key 46. Some or all of the control information in the reply 91 is encrypted using the point-to-point security association between the personal client 40 and the management server 28, which includes PP key 29. The reply 91 may look similar to the following.

```
Reply 91:    {method_id = "GetDocumentResponse",
             args = {document = xxx,
             size = 5123,
             content_type= "text/plain",
             name ="readme.txt"}
             }
```

According to the encryption schema, the method_id may be encrypted using the PP key 29 and the remainder of the contents in reply 91 may be encrypted using the EE key 46.

Data Streaming

Figure 9:
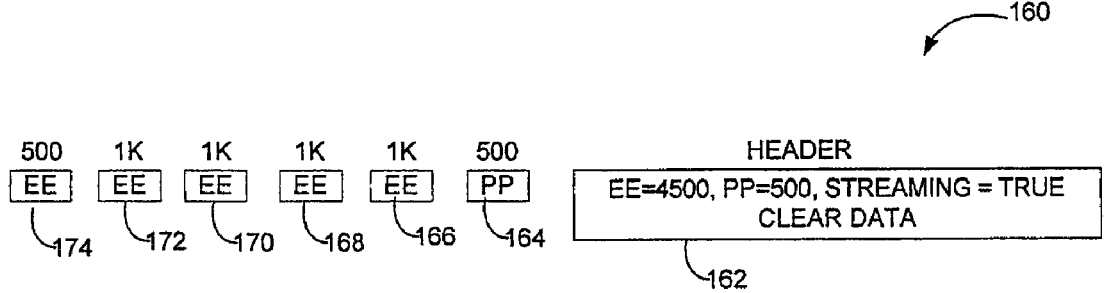
FIG. 9 shows how a large transaction is encoded into multiple packets.

Referring to FIG. 9, multiple packets 162-174 are used for transporting different portions of the same transaction 160. The multipacket transaction 160 may be used when one or more large documents are transferred between personal client 40 and the mobile device 21.

In one example, predetermined maximum packet length is configured to be 1000 bytes. If the transaction 160 is determined to be less than 1000 bytes, the contents of the clear, pp, and ee channels are encoded into a single packet. However, in this example, it is determined that 500 bytes of data exist in the pp channel and 4500 bytes of data exist in the ee channel. All the contents of the pp channel are encoded into a 500 byte packet 164. The data from the ee channel is encoded into four separate 1000 byte packets 166-174 and one 500 byte packet 174.

A header packet 162 is formed that identifies all the packets 162-174 as part of the same transaction 160. The data in the header packet 162 is unencrypted. Since the header packet 162 is unencrypted, it can also contain data from the clear channel. Alternatively, data from the clear channel can be encoded into a separate unencrypted packet. The header packet 162 identifies 500 bytes of data encrypted using the PP encryption key and 4,500 bytes of data encrypted using the EE encryption key.

The node receiving the message 160 reads the header 162 and determines the transaction 160 is a multipacket message (streaming=true). In one embodiment, the clear packet header 162 always comes first and is immediately followed by the pp packet 164. The pp packet 164 is immediately followed by ee packets 166-174. This order can be guaranteed using protocols such as Transmission Control Protocol/Internet Protocol (TCP/IP). Transmitting the packets in this predetermined order eliminates having to attach labels to each packet to identify the type of encryption. Alternatively, sequence numbers can be assigned to the packets 162-174.

The node receiving transaction 160 may receive, decrypt and decode different portions of the transaction 160 at a time. For example, the processing node may first process the unencrypted clear data in the header packet 162 to determine if the transaction 160 is unauthorized. If the transaction is not authorized, the processing node can discard the remainder of the transaction 160 without having to decrypt and decode the pp packet 164 and ee packets 166-174.

If the information in the header packet 162 is authorized, the processing node decrypts and decodes data in the pp packet 164. If the data in the pp packet 164 is invalid or has been tampered with, the remaining ee packets 166-174 can be discarded without being further processed.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A system for secure communication in a mobile network, the system comprising:
    a server configured to:
    encrypt or decrypt an item in a plurality of transactions in the mobile network based on a security association associated with a data type of the item;
    wherein, the server is communicatively coupled to the mobile network, the mobile network including an endpoint of the plurality of transactions.

2. The system of claim 1, wherein the security association which is associated with the data type is specified in an encryption schema.

3. The system of claim 2, wherein, the server is configured with the encryption schema.

4. The system of claim 2, wherein, one of the plurality of transactions is generated by a mobile device, wherein, the mobile device is configured with the encryption schema.

5. The system of claim 1, wherein the plurality of types of item comprises one or more of: email data, calendar data, contact data, and task data.

6. The system of claim 1, wherein the plurality of transactions comprise a data synchronization transaction.

7. The system of claim 1, wherein, one of the plurality of transactions is generated by a mobile device.

8. The system of claim 1, wherein, the server is further coupled to at least one enterprise network communicatively, said at least one enterprise network includes at least one endpoint of the plurality of transactions.

9. The system of claim 1, wherein, the server is intermediary to the mobile network and the at least one enterprise network.

10. The system of claim 1, wherein the server is further configured to:
    process the plurality of transactions having a plurality of types of items;
    associate each of the plurality of types of item with a corresponding security associations in accordance with an encryption schema.

11. The system of claim 1, wherein, the security association is associated with a given channel in the plurality of transactions.

12. A method for secure communication in a mobile network, the method comprising:
    encrypting or decrypting an item in the plurality of transactions in the mobile network based on a security association with a data type of the item;
    receiving the item from, or transmitting the item to, an endpoint for the plurality of transactions via the mobile network.

13. The method of claim 12, further comprising,
    processing the plurality of transactions having multiple types of items;
    associating each of the multiple types of item with a corresponding security association;
    correlating the corresponding security association with a given channel in the plurality of transactions.

14. The method of claim 12, wherein at least one of the plurality of transactions comprises multiple data types of items.

15. The method of claim 12, wherein the security association comprises a point-to-point security association.

16. The method of claim 12, wherein the security association specifies a cryptographic algorithm or a cryptographic key length.

17. The method of claim 12, wherein one of the plurality of transactions is associated with multiple security associations.

18. The method of claim 12, wherein an encryption schema specifies a associations between data types of items and security associations.

19. The method of claim 12, wherein the security association comprises an end-to-end security association.

20. A mobile device for secure communication in a mobile network, the mobile device comprising:
    A processor configured to, associate a data type of an item with a security associations;
    encrypt or decrypt the item a plurality of transactions in the mobile network based on the security association;
    communicate with the mobile network, the mobile network including an endpoint of the plurality of transactions.

21. The mobile device of claim 20, wherein the security association which is associated with the data type is specified in an encryption schema.

22. The mobile device of claim 20, wherein the security association specifies a cryptographic algorithm or a cryptographic key length.

\* \* \* \* \*